United States Patent
Shioya et al.

[11] Patent Number: 5,942,824
[45] Date of Patent: Aug. 24, 1999

[54] MOTOR AND METHOD OF MANUFACTURING SAME

[75] Inventors: Kohei Shioya, Kanagawa; Hiromu Ono, Mie-ken; Hiromi Ito, Mie-ken; Seiichiro Kato, Mie-ken, all of Japan

[73] Assignee: Fuji Xerox Co., Ltd., Japan

[21] Appl. No.: 08/902,333

[22] Filed: Jul. 29, 1997

[30] Foreign Application Priority Data

Jan. 28, 1997 [JP] Japan ................................. 9-014142

[51] Int. Cl.$^6$ .................................................. H02K 7/09
[52] U.S. Cl. .................... 310/90.5; 310/68 B; 310/268; 310/156; 310/43
[58] Field of Search ............... 310/90.5, 68 B, 310/268, 156, 43

[56] References Cited

U.S. PATENT DOCUMENTS

| | | | |
|---|---|---|---|
| 5,574,322 | 11/1996 | Nii et al. | 310/90.5 |
| 5,623,382 | 4/1997 | Moritan et al. | 360/99.08 |
| 5,650,674 | 7/1997 | Hayashi | 310/51 |
| 5,835,124 | 11/1998 | Fukita et al. | 347/260 |

FOREIGN PATENT DOCUMENTS

| | | |
|---|---|---|
| 4-204625 | 7/1992 | Japan . |
| 6-123848 | 5/1994 | Japan . |
| 6-165460 | 6/1994 | Japan . |

*Primary Examiner*—Nestor Ramirez
*Assistant Examiner*—Thanh Lam
*Attorney, Agent, or Firm*—Finnegan, Henderson, Farabow, Garrett & Dunner, L.L.P.

[57] ABSTRACT

A motor comprising: a rotor which is supported via a rotating shaft in a radial direction of the rotating shaft, the rotating shaft being disposed around a fixed shaft provided on the side of a stator to form a dynamic-pressure bearing; a stator-side thrust magnet disposed in the stator so as to support the rotor with respect to the stator in a thrust direction of the rotating shaft; a rotor-side thrust magnet disposed in the rotor; and a rotating main body portion mounted to the rotating shaft of the rotor and formed integrally by a resin magnetic material, in which a main magnet portion, an FG magnet portion for generating a speed-of-rotation detecting pulse, and a rotor-side thrust magnet portion serving as said rotor-side thrust magnet are respectively polarized at predetermined positions in the rotating main body portion. As a result, the reliability of an optical deflector in which the motor is used improves and the number of parts and the number of assembling processes are both reduced due to a simple structure. Further, a balance correction operation of the rotor is eliminated so as to allow a simple manufacturing operation, and even when the rotor is rotated at high speed, a stable optical scanning operation can be effected.

12 Claims, 36 Drawing Sheets

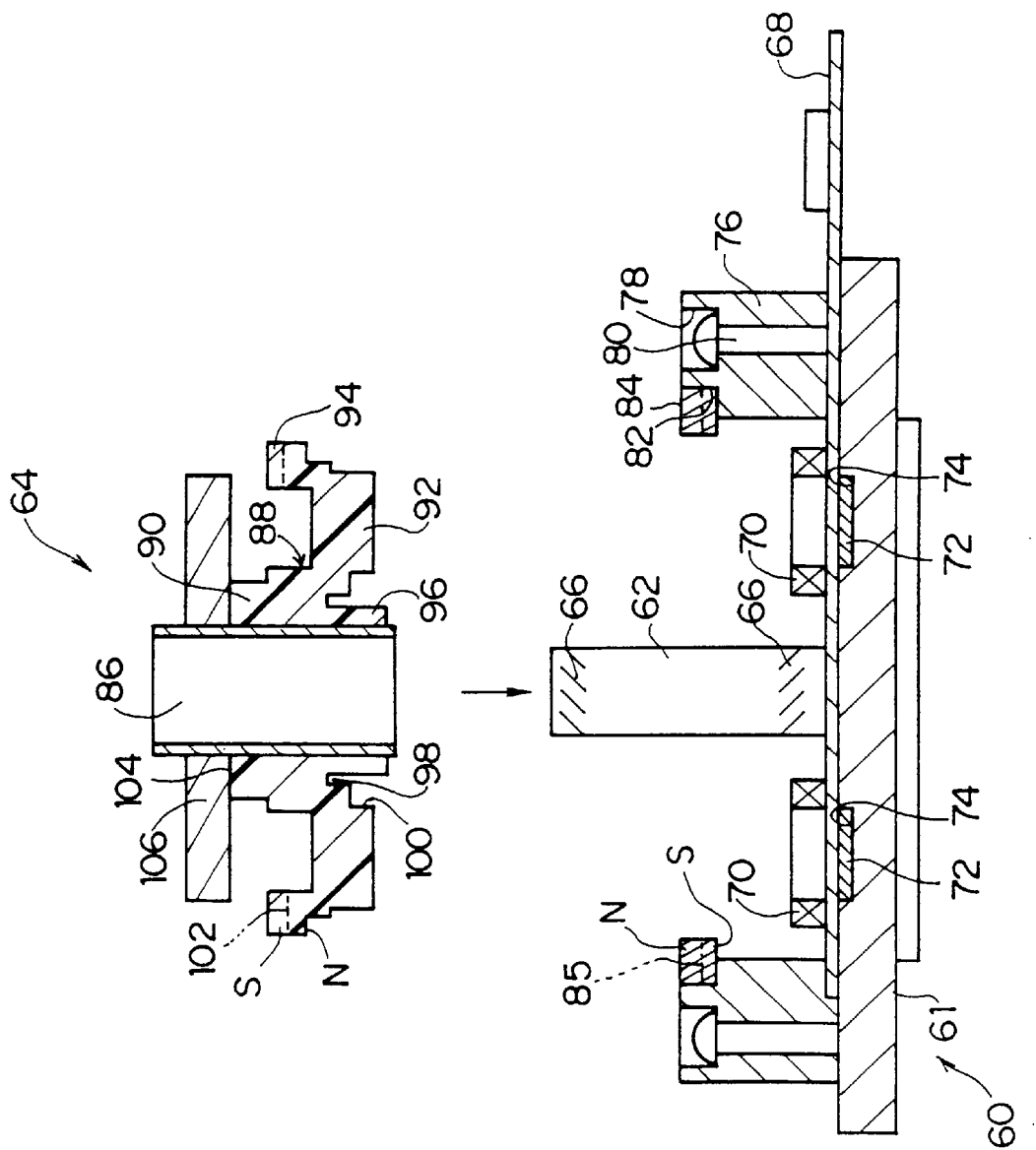

F I G. 17
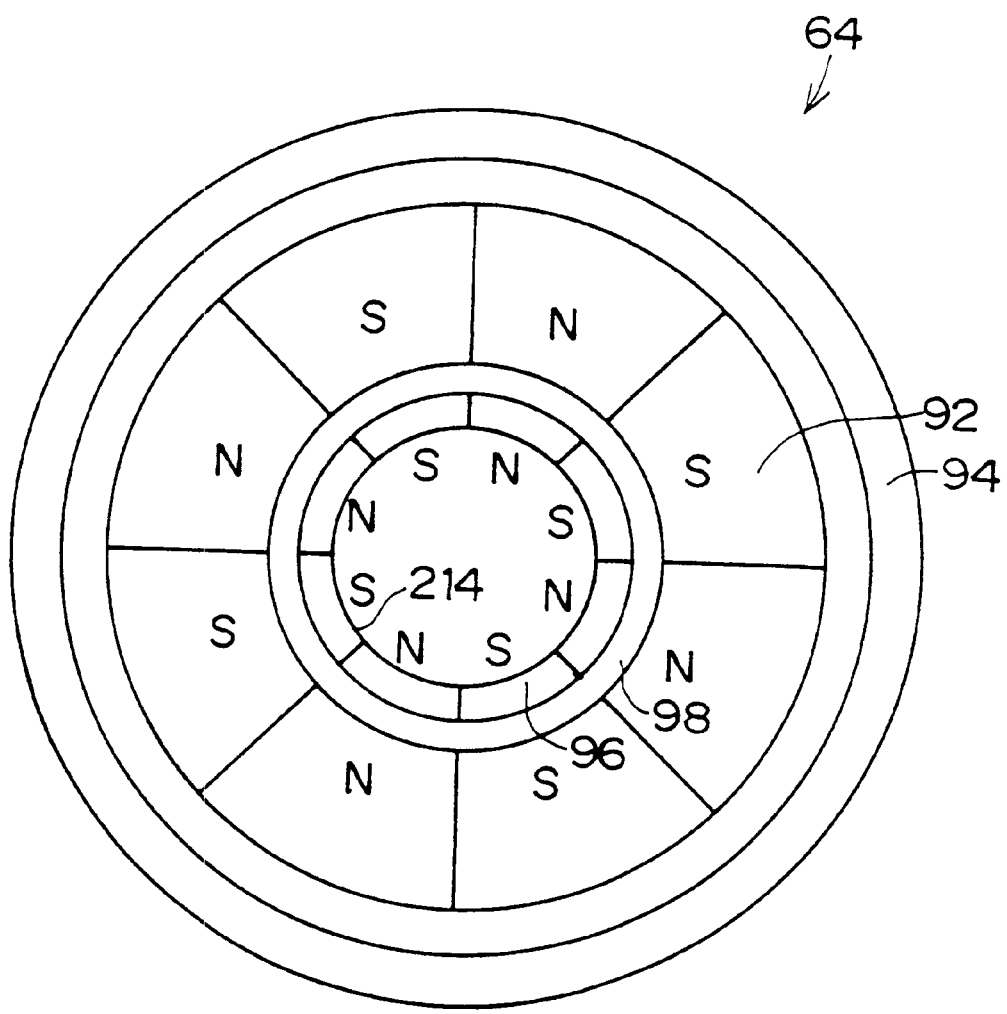

F I G. 2 4
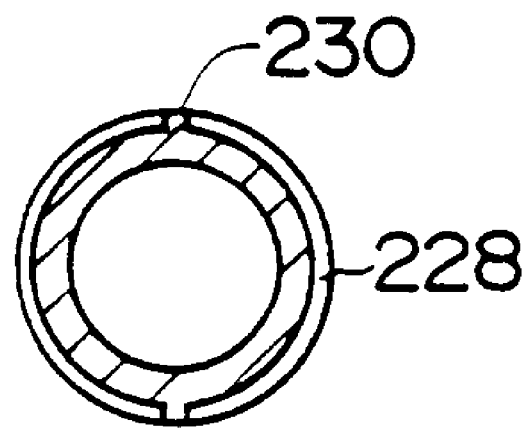

F I G. 3 6
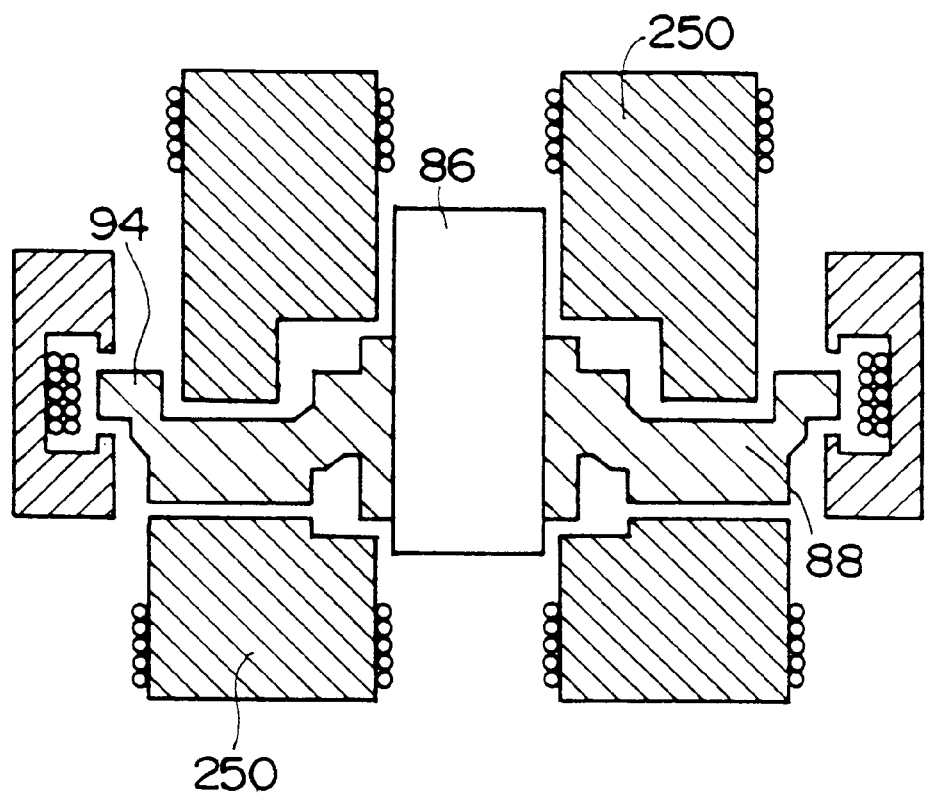

MOTOR AND METHOD OF MANUFACTURING SAME

BACKGROUND OF THE INVENTION

1. Field of the Invention

The present invention relates to a motor which can be applied to an optical scanning device or the like, used by a laser printer, a digital copying machine, a laser facsimile, and the like, and a method of manufacturing the motor, and particularly to a drive motor with a dynamic-pressure bearing which allows high-speed rotation of an optical member, and a method of manufacturing the drive motor.

2. Description of the Related Art

Generally, in an optical scanning device in which a light beam is scanned on a recording medium, an optical deflector is used in which an optical member such as a polygon mirror, a hologram disk, or the like (which will be hereinafter referred to as a polygon mirror) is provided to rotate at high speed by a drive motor, for example, a coreless motor in order that a light beam including information may be deflected and scanned in a predetermined direction.

In recent years, a drive motor used by an optical deflector requires high-speed rotation of 10,000 to 30,000 rpm or more due to high-speed operation and high image quality tendency of a laser beam printer or a digital copying machine. Therefore, as a bearing of a drive motor, a dynamic-pressure bearing is employed in place of a conventionally used ball bearing from the viewpoint of the duration of life of the bearing.

Conventionally, a motor used by the optical deflector as described above is constructed such that, as shown in FIGS. 37 through 43, a rotor 16 in which a polygon mirror is provided in a fixed shaft 14 formed upright on a base member 12 disposed on the side of a stator 10 is supported by a dynamic-pressure bearing, excitation-switching control is effected for a drive coil 20 serving as a coreless coil and formed on a coil substrate 18 disposed on the base member 12, and the rotor 16 is rotated due to magnetic force acting between the drive coil 20 and a main magnet 22 disposed on the side of the rotor 16.

As also shown in FIG. 38, the fixed shaft 14 is formed upright at the central portion of the base member 12 in the stator 10. Herringbone grooves 24 which form a dynamic-pressure bearing are formed on an outer peripheral surface of the fixed shaft 14.

The coil substrate 18 is disposed on the surface of the base member 12 where the fixed shaft 14 is formed. Six drive coils 20 are disposed at predetermined positions on the coil substrate 18 and a control circuit (not shown) for these drive coils 20 is also formed thereon.

Further, a yoke 28 is disposed to be accommodated within a shallow groove 30 formed in the base member 12 at a position on the coil base plate 18, corresponding to the drive coil 20, on the side opposite to that where the drive coil 20 is formed (i.e., at the lower side of the drive coil 20 as shown toward the front in FIG. 37). The yoke 28 is used to direct, toward the rotor 16, magnetic line of force generated by the drive coil 20 and turned to the base member 12.

As shown in FIGS. 37 through 39, a thrust magnet holder 32 is mounted onto the base member 12. The holder 32 is made of aluminum and has a rectangular configuration with a circular opening being provided at the center thereof. The magnet holder 32 is also disposed and positioned at a predetermined location on the base member 12 in such a manner that a fastening member 34 passes through each of through holes 36 respectively formed at four corner portions of the holder 32. A stepped portion having a cut of an L-shaped cross section is formed in a peripheral portion of the circular opening formed in the holder 32, and a stator-side thrust magnet 38 made of a nylon-resin magnetic material and formed in the shape of a ring having a rectangular cross-sectional configuration is stuck to the stepped portion by an adhesive agent.

The rotor 16 mounted to the stator 10 having the above-described structure is formed as shown in FIG. 37 and FIGS. 40 to 43. As shown in FIGS. 37 and 40, a rotating shaft 40 of the rotor 16 is formed in the shape of a hollow cylinder and is disposed around the fixed shaft 14 of the stator 10 so that the fixed shaft 14 passes through the rotating shaft 40. When the rotating shaft 40 rotates at high speed, a radial bearing which is a dynamic-pressure bearing is formed between the fixed shaft 14 and the rotating shaft 40.

A ring-shaped flange 42 made of aluminum is fixed by shrink fitting at a predetermined position on the outer periphery of the rotating shaft 40. The flange 42 is provided with a mirror mounting portion 44 and a polygon mirror 48 is fixed on a mounting surface 46 of the mirror mounting portion 44. The mounting surface 46 is formed to be perpendicular to a shaft core of the rotating shaft 40 at high accuracy. Further, the polygon mirror 48 is formed in the shape of a polygonal prism and a side surface portion thereof is formed as a mirror finished surface.

A driving main magnet 22 made of a nylon-resin magnetic material is stuck to the surface of the flange 42 corresponding to the drive coil 20 on the side of the stator 10 by an adhesive agent. As also shown in FIG. 43, the main magnet 22 is entirely formed in the shape of a ring and an opening peripheral portion 52 whose inner diameter is made larger in a stepped manner is formed in the opening portion of the magnet 22 on the side of the stator 10. Further, the main magnet 22 is divided into eight equal sections each at an angle of 45 degrees from the center and these sections are respectively polarized to have an N pole and an S pole so that adjacent sections have different poles.

As also shown in FIG. 40, an FG magnet 54 for generating a speed-of-rotation detecting pulse, having a small cylindrical shape and made of a nylon-resin magnetic material, is stuck by an adhesive agent to a portion of the rotating shaft 40 protruding from the flange 42 to the stator 10 in such a manner that one end surface the magnet 54 is attached to the surface of the flange 42. The FG magnet 54 is divided into eight equal sections each at an angle of 45 degrees from the center and these sections are respectively polarized to have an N pole and an S pole so that adjacent sections have different poles.

Further, a stepped portion 56 having an annular cut of a rectangular cross section is formed in an outer peripheral corner portion of the flange 42 on the side opposite to that of the stator 10. A ring-shaped rotor-side thrust magnet 58 made of a nylon-resin magnetic material is stuck by an adhesive agent to the stepped portion 56.

As shown in FIG. 37, the rotor-side thrust magnet 58 and the stator-side thrust magnet 38 are provided to be coaxial with each other and are disposed adjacently at a predetermined interval. The outer peripheral surface of the rotor-side thrust magnet 58 and the inner peripheral surface of the stator-side thrust magnet 38 have different poles so that attractive force is generated therebetween, and a thrust magnetic bearing is thereby formed. The thrust magnetic bearing operates to float the whole rotor 16 in such a manner that attractive force acting between these magnets 38, 58 surpasses load in a thrust direction (i.e., an axial direction) of the rotating shaft 40 of the rotor 16.

For this reason, the rotor 16 is supported and received by the thrust magnetic bearing in the thrust direction and is also supported and received by a dynamic-pressure bearing in a radial direction. As a result, the rotor 16 is controlled by a drive circuit of the coil substrate 18 so that an alternating voltage is applied to the six drive coils 20, and high-speed rotation of the rotor 16 is allowed with the rotor 16 floating in the air.

The above-described optical deflector, particularly a motor thereof has the structure in that, on the side of the rotor 16, the main magnet 22, the FG magnet 54, and the rotor-side thrust magnet 58, which are each made of a nylon-resin magnetic material whose thermal expansion coefficient is different from that of the flange 42, are stuck to the flange 42 made of aluminum. For this reason, when, at the time of using the optical deflector, the rotor 16 is rotated at high speed and generates heat, thermal stress is generated between the flange 42 and each of the magnets 22, 54, 58 as shown in Table 1 below.

TABLE 1

| Data with regard to adhering of magnets | |
|---|---|
| resin magnetic material (nylon) | aluminum |
| linear expansion coefficient $50 \times 10^6$ | linear expansion coefficient $23.1 \times 10^{-6}$ |

Thermal stress at a portion where the resin magnetic material is stuck to an aluminum member: $0.01 \text{ kg/m}^2$ Centrifugal stress at the portion where the resin magnetic material is stuck to an aluminum member: $0.062 \text{ kg/m}^2$ (16,000 rpm)

Namely, the linear expansion coefficient of the flange 42 made of aluminum is $23.1 \times 10^{-6}$ and the linear expansion coefficient of each of the magnets 22, 54, 58 made of nylon resin is $50 \times 10^{-6}$. Due to the heat generated when the rotor 16 is rotated at the speed of rotation of 16,000 rpm, the thermal stress acting at a portion where the flange 42 is stuck to each of the main magnet 22, the FG magnet 54, and the rotor-side thrust magnet 58 is $0.01 \text{ kg/mm}^2$.

At the same time, due to centrifugal force generated when the rotor 16 rotates at the speed of rotation of 16,000 rpm, centrifugal stress of $0.062 \text{ kg/mm}^2$ acts at the portion where the flange 42 is stuck to each of the main magnet 22, the FG magnet 54, and the rotor-side thrust magnet 58. As a result, the total stress of $0.072 \text{ kg/mm}^2$ acts at the portion where the flange 42 is stuck to each of the main magnet 22, the FG magnet 54, and the rotor-side thrust magnet 58. For this reason, when the rotor 16 is used for a long time, the adhered portions are broken and these magnets 22, 54, 58 are respectively separated from the flange 42, which forms a hindrance to rotation of the rotor 16.

Further, during assembling and manufacturing of the rotor 16, the operation of adhering each of the main magnet 22, the FG magnet 54, and the rotor-side thrust magnet 58 to the flange 42 by using an adhesive agent requires a large number of operating processes and much time, thereby resulting in an increase of manufacturing cost.

Moreover, the rotor 16 is constructed such that the main magnet 22, the FG magnet 54, and the rotor-side thrust magnet 58, which are each formed as a separate body, are respectively mounted to the flange 42, and therefore, the inertia of the whole rotor 16 increases and initial unbalanced weight also becomes large.

For this reason, the operation of correcting balance of the rotor 16 becomes indispensable until the completion of assembling of the rotor 16, and therefore, the number of processes of the assembling operation increases and the manufacturing cost becomes high.

Next, the stator 10 in the optical deflector, particularly, in a motor has a structure in which the stator-side thrust magnet 38 made of a nylon-resin magnetic material is stuck to the aluminum holder 32, the magnet 38 being made of a material whose thermal expansion coefficient is different from that of the holder 32. For this reason, when, due to heat generated during the rotation of the rotor 16, thermal stress of $0.01 \text{ kg/mm}^2$ operates, as shown in Table 1 described above, at the portion where the holder 32 is stuck to the stator-side thrust magnet 38, the adhered portion is broken and the stator-side thrust magnet 38 is thereby separated from the holder 32. This may form a hindrance to the rotation of the rotor 16.

Further, the operation of adhering the stator-side thrust magnet 38 to the holder 32 requires a large number of operation processes and much time, and therefore, the manufacturing cost increases.

Moreover, in order that the interval between the stator-side thrust magnet 38 which forms the thrust bearing and the rotor-side thrust magnet 58 be correctly maintained, it is necessary that the holder 32 be positioned at high accuracy so as to be fixed to the base member 12 such that the stator-side thrust magnet 38 and the fixed shaft 14 of the base member 12 are made coaxial with each other, which requires a great deal of time.

In the whole optical deflector, particularly in the whole motor, the flange 42, the main magnet 22, the FG magnet 54, the rotor-side thrust magnet 58, the holder 32, and the stator-side thrust magnet 38, which are each formed as a separate body, are used as component parts of the optical deflector. For this reason, the number of parts increases and the manufacturing cost thereby becomes higher.

In order to solve the above-described problems, there may be considered each method disclosed in Japanese Patent Application Laid-Open (JP-A) Nos. 4-204625, 6-165460, and 6-123848 which have been conventionally proposed. The method disclosed in JP-A No. 4-204625 improves the balance of a rotor by integrally forming a flange, a main magnet, and an FG magnet so as to lessen the inertia of the rotor. The method disclosed in JP-A No. 6-165460 allows reduction in each number of parts and assembling processes by integrally forming the main magnet and the flange portion and does not require a balance correcting operation. Further, the method disclosed in JP-A No. 6-123848 allows reduction in each number of parts and assembling processes by integrally forming the main magnet and the flange portion from resin magnetic materials, thereby resulting in that the balance correcting operation is completed at one time.

However, the above-described methods each use a rolling bearing as the bearing of the rotor, and none of these methods has a structure having a thrust magnetic bearing inherent in the dynamic-pressure bearing. Accordingly, even when either of these methods is used, it is not possible to solve the problems in that the adhered portion of a stator-side or rotor-side thrust magnet inherent in the optical deflector having the dynamic-pressure bearing which also serves as the thrust magnet bearing is separated, or that the manufacturing cost increases due to a large number of assembling processes and difficult operation.

Further, the optical deflector in which the rolling bearing is used allows working speed of rotation up to 10,000 rpm or thereabouts. For this reason, even when the rotor has an integral structure made of a resin magnetic material, the deformation of the rotor due to the centrifugal force is small. However, in the optical deflector in which the dynamic-pressure bearing is used, the speed of rotation of 10,000 rpm to 30,000 rpm or more is allowed, and therefore, there is a possibility that, in a rotor having an integral structure made of only resin magnetic material, distortion occurs on a mirror surface of a polygon mirror due to the deformation of the rotor, which is caused by the centrifugal force. As a result, the structure of the optical deflector in which the rolling bearing is used cannot be simply applied.

SUMMARY OF THE INVENTION

In view of the above-described circumstances, an object of the present invention is to provide a motor provided to eliminate an impediment to rotation of a rotor, which is caused by separation of an adhered portion of each of magnets, improve reliability of operation of an optical deflector in a case of being applied to the optical deflector, have a simple structure to allow reduction in each number of parts and assembling processes, and a method of manufacturing the motor.

Further, another object of the present invention is to provide a motor which eliminates a balance correcting operation of the rotor which requires a great deal of time, and even when the rotor is rotated at high speed of 10,000 rpm to 30,000 rpm, the motor allowing stabilized optical scanning operation without causing distortion in the rotor and in a polygon mirror (provided when the motor is applied to the optical deflector), and a method of manufacturing the motor.

A first aspect of the present invention is a motor comprising: a rotor which is supported via a rotating shaft in a radial direction of the rotating shaft, the rotating shaft being disposed around a fixed shaft provided on the side of a stator to form a dynamic-pressure bearing; a stator-side thrust magnet disposed in the stator so as to support the rotor with respect to the stator in a thrust direction of the rotating shaft; a rotor-side thrust magnet disposed in the rotor; and a rotating main body portion mounted to the rotating shaft of the rotor and formed integrally by a resin magnetic material, in which a main magnet portion, an FG magnet portion for generating a speed-of-rotation detecting pulse, and a rotor-side thrust magnet portion serving as the rotor-side thrust magnet are respectively polarized at predetermined positions in the rotating main body portion.

Due to the above-described structure, the rotating main body portion has an integral structure in which predetermined sections of the integrally molded rotating main body portion are respectively polarized to have predetermined poles and no adhering structure is required. For this reason, there is no possibility that adhered magnets are separated due to thermal stress caused by generation of heat during an operation of a motor in the optical deflector or due to centrifugal stress caused by high-speed rotation of the rotor, and when the motor is used by an optical deflector, the reliability of the optical deflector can be improved.

Further, in the integral structure of the rotating main body portion, inertia thereof becomes relatively small, and therefore, an initial imbalance weight can be reduced. Accordingly, at the time of low speed of rotation, no balance correction of the rotor is required and operating efficiency can be improved with a balance correcting operation during assembling and manufacturing of the rotor eliminated. Moreover, the adhering process can be eliminated and a moderate-priced product can be provided accordingly.

In addition, in the case in which the motor of the above-described aspect is applied to the optical deflector, even when the rotor is rotated at the speed of rotation of 10,000 rpm to 30,000 rpm or more, there is no adverse effect of vibration or distortion of the rotor upon the optical scanning operation and a stabilized optical scanning operation can be realized.

A second aspect of the present invention is a motor comprising: a rotor which is supported via a rotating shaft in a radial direction of the rotating shaft, the rotating shaft being disposed around a fixed shaft provided on the side of a stator to form a dynamic-pressure bearing; a stator-side thrust magnet disposed in the stator so as to support the rotor with respect to the stator in a thrust direction of the rotating shaft; a rotor-side thrust magnet disposed in the rotor; and a rotating main body portion mounted to the rotating shaft of the rotor and formed integrally by a resin magnetic material, in which a main/FG magnet portion with a main magnet and an FG magnet for generating a speed-of-rotation detecting pulse being integrally formed, and a rotor-side thrust magnet portion serving as the rotor-side thrust magnet are respectively polarized at predetermined positions in the rotating main body portion.

Due to the above-described structure, the structure of the rotating main body is simplified and the shape of a molding die thereof is also made simple, thereby allowing manufacture at a low price. Further, the initial imbalance weight during molding is reduced and the rigidity of the rotating main body portion can be improved.

A third aspect of the present invention is a motor comprising: a rotor which is supported via a rotating shaft in a radial direction of the rotating shaft, the rotating shaft being disposed around a fixed shaft provided on the side of a stator to form a dynamic-pressure bearing; a rotor-side thrust magnet disposed in the rotor; and a base portion serving as a stator, in which a stator-side base pedestal portion, a holder portion projecting from the stator-side base pedestal portion, and a stator-side thrust magnet portion provided in the holder portion are integrally formed by a resin magnetic material and the stator-side thrust magnet portion is polarized to form a stator-side thrust magnet which supports the rotor with respect to the stator in a thrust direction of the rotating shaft.

Due to the above-described structure, the stator-side base pedestal portion, the holder portion, and the stator-side thrust magnet portion are integrally formed. Accordingly, during assembling and manufacturing of the optical deflector including the motor of this aspect, it is not necessary that concentricity of the fixed shaft formed upright on the base portion and the stator-side thrust magnet portion is adjusted at high accuracy. For this reason, a facilitated assembling operation can be achieved and the number of assembling processes can be reduced, thereby resulting in provision of a moderate-priced product.

A fourth aspect of the present invention is a motor comprising: a rotor which is supported via a rotating shaft in a radial direction of the rotating shaft, the rotating shaft being disposed around a fixed shaft provided on the side of a stator to form a dynamic-pressure bearing; a rotor-side thrust magnet disposed in the rotor; and a base portion serving as a stator, in which a stator-side base pedestal portion and a holder portion projecting from the stator-side base pedestal portion are formed from a non-magnetic resin material and a stator-side thrust magnet portion provided in the holder portion is formed by a magnetic resin material, the non-magnetic resin material and the magnetic resin material being integrally formed by two-color molding means, and the stator-side thrust magnet portion is polarized to form a stator-side thrust magnet which supports the rotor with respect to the stator in a thrust direction of the rotating shaft.

In accordance with the above-described structure, since the base portion is formed, it is not necessary that a costly resin magnetic material is used for a large-volume portion formed by the stator-side base pedestal portion and the holder portion. As a result, the amount of the resin magnetic material to be used is reduced to the utmost and a moderate-priced product can be provided accordingly.

A fifth aspect of the present invention is a motor comprising: a rotor which is supported via a rotating shaft in a radial direction of the rotating shaft, the rotating shaft being disposed around a fixed shaft provided on the side of a stator to form a dynamic-pressure bearing; a rotor-side thrust magnet disposed in the rotor; one of a rotating main body portion mounted to the rotating shaft of the rotor and formed integrally by a resin magnetic material, in which a main magnet portion, an FG magnet portion for generating a speed-of-rotation detecting pulse, and a rotor-side thrust magnet portion serving as the rotor-side thrust magnet are respectively polarized at predetermined positions in the rotating main body portion, and a rotating main body portion mounted to the rotating shaft of the rotor and formed integrally by a resin magnetic material, in which a main/FG magnet portion with a main magnet and an FG magnet for generating a speed-of-rotation detecting pulse being integrally formed, and a rotor-side thrust magnet portion serving as the rotor-side thrust magnet are respectively polarized at predetermined positions in the rotating main body portion; and one of a base portion serving as a stator, in which a stator-side base pedestal portion, a holder portion projecting from the stator-side base pedestal portion, and a stator-side thrust magnet portion provided in the holder portion are integrally formed by a resin magnetic material and the stator-side thrust magnet portion is polarized to form a stator-side thrust magnet which supports the rotor with respect to the stator in a thrust direction of the rotating shaft, and a base portion serving as a stator, in which a stator-side base pedestal portion and a holder portion projecting from the stator-side base pedestal portion are formed from a non-magnetic resin material and a stator-side thrust magnet portion provided in the holder portion is formed by a magnetic resin material, the non-magnetic resin material and the magnetic resin material being integrally formed by two-color molding means, and the stator-side thrust magnet portion is polarized to form a stator-side thrust magnet which supports the rotor with respect to the stator in a thrust direction of the rotating shaft.

In accordance with the above-described structure provided by the motor of this aspect, respective effects obtained by the stator and the rotor which are combined to form the optical deflector are combined, and therefore, the reliability of the optical deflector can be improved still further and greater reduction in cost can be achieved.

A sixth aspect of the present invention is a motor described in the above-described first to fifth aspects of the present invention, wherein the resin magnetic material and the resin material which are respectively used to form the rotating main body portion and the base portion are each formed with a reinforcing material mixed to improve strength thereof.

In accordance with the above-described structure provided by the motor of this aspect, even when generation of heat occurs due to the high-speed rotation of the rotor, deformation and breaking of the base portion or the rotating main body can be prevented. In addition, even when large centrifugal force caused by the high-speed rotation acts in the rotating main body portion of the rotor, deformation of the rotor can be reduced and breaking thereof can be prevented. As a result, the reliability of an optical deflector including the motor of this aspect can be improved.

A seventh aspect of the present invention is a motor comprising: a rotor which is supported via a rotating shaft in a radial direction of the rotating shaft, the rotating shaft being disposed around a fixed shaft provided on the side of a stator to form a dynamic-pressure bearing; a stator-side thrust magnet disposed in the stator so as to support the rotor with respect to the stator in a thrust direction of the rotating shaft; a rotor-side thrust magnet disposed in the rotor to correspond to the stator-side thrust magnet; a flange portion fixed to the rotating shaft of the rotor and made of a material having a relatively high rigidity and; and a rotating main body portion mounted integrally to the flange portion and formed integrally by a resin magnetic material, in which a main magnet portion, an FG magnet portion for generating a speed-of-rotation detecting pulse, which is formed integrally to be included in the main magnet portion or is formed separately, and a rotor-side thrust magnet portion serving as the rotor-side thrust magnet are respectively polarized at predetermined positions in the rotating main body portion.

In accordance with the above-described structure provided by the motor of this aspect, the rigidity of the flange portion can be made higher and the processing precision can also be improved. For this reason, a well-balanced state of the rotor is obtained with improved assembling precision, and even when the rotor is rotated at high speed for a long period of time, no distortion occurs in the rotor due to the high rigidity. As a result, the reliability of the operation of the rotor can be improved.

An eighth aspect of the present invention is a motor comprising: a rotor which is supported via a rotating shaft in a radial direction of the rotating shaft, the rotating shaft being disposed around a fixed shaft provided on the side of a stator to form a dynamic-pressure bearing; a stator-side thrust magnet disposed in the stator so as to support the rotor with respect to the stator in a thrust direction of the rotating shaft; a rotor-side thrust magnet disposed in the rotor to correspond to the stator-side thrust magnet; a rotating main body portion which is formed integrally by a resin magnetic material with respect to the rotating shaft of the rotor; and a main magnet portion, an FG magnet portion for generating a speed-of-rotation detecting pulse which is integrally formed to be included in the main magnet portion or is formed separately, and a rotor-side thrust magnet portion serving as the rotor-side thrust magnet, these magnet portions being respectively polarized at predetermined positions in the rotating main body portion.

In accordance with the above-described structure, the rotating shaft of the rotor and the resin magnetic material of the rotating main body can be connected rigidly due to molding pressure during integral molding and due to shrinkage of the resin magnetic material. Thereafter, the main magnet portion, the FG magnet portion for generating a speed-of-rotation detecting signal (which may be integrally formed with the main magnet portion to be included therein), and the rotor-side thrust magnet portion for the thrust magnetic bearing are polarized at predetermined positions in the rotating main body portion.

In this case, high-accurate positioning of a sleeve required by this type of rotor and the resin magnetic material can be achieved by improving the precision of a mold during integral molding and the balance adjusting operation can be eliminated accordingly.

Further, the adhering process required by the conventional rotor can be eliminated and the number of parts decreases. For this reason, the operating efficiency can be improved and a moderate-priced product can be provided. In addition, it is not necessary to use unstable material such as an adhesive agent, and therefore, a product of stable quality can be manufactured.

A ninth aspect of the present invention is a motor described in the above-described eighth aspect, wherein the rotating shaft and the rotating main body portion in the rotor are formed integrally by injection insert molding.

In accordance with the above-described structure, the number of adhering processes of the rotating shaft of the rotor and the resin magnetic material of the rotating main body portion can be reduced, and further, it is not necessary to use an unstable material such as an adhesive agent. This makes it possible to manufacture a product of stable quality.

Further, high-accurate positioning of a sleeve required by this type of rotor and the resin magnetic material can be achieved by improving the precision of a mold during integral molding, and therefore, the balance adjustment operation can be eliminated.

A tenth aspect of the present invention is a motor described in any one of the above-described eighth and ninth aspects, wherein a groove having a rectangular or V-shaped cross-sectional configuration is formed at a portion of the rotating shaft of the rotor, where the rotating main body portion is connected to the rotating shaft, so as to strengthen connection of the resin magnetic material of the rotating main body portion at least in the radial direction of the rotating shaft.

Due to the above-described structure, in addition to peeling force acting in a centrifugal direction which is generated during thermal expansion of the resin magnetic material, connecting force due to an axial expansion of the resin magnetic material with respect to the groove is generated in a portion where the integrally formed rotating main body portion is connected to the rotating shaft having the groove. For this reason, as compared with a rotating shaft having no groove, the rotating shaft of the rotor and the resin magnetic material of the rotating main body portion are rigidly connected to each other and the connecting strength acting in the radial direction of the rotating shaft is increased and the reliability of the rotor can be improved accordingly.

An eleventh aspect of the present invention is a motor described in the tenth aspect, wherein a reinforcing portion is provided in a portion of the groove so as to reinforce connecting force of a circumferential direction acting between the rotating shaft and the resin magnetic material of the rotating main body portion.

Due to the above-described structure, since the connecting force acting in the circumferential direction of the rotating shaft is strengthened, the connecting strength is further improved as compared with a structure in which a groove extending in the circumferential direction is formed, and the reliability of the rotor can be improved accordingly.

Further, high-accurate positioning of the rotating shaft required by this type of rotor and the resin magnetic material of the rotating main body portion can be achieved by increasing the precision of the mold during integral molding, and therefore, the balance adjustment operation can be eliminated.

A twelfth aspect of the present invention is a method of manufacturing a motor having a rotating shaft which is disposed around a fixed shaft provided in a stator to form a dynamic-pressure bearing, comprising the steps: setting an interior of a cavity of molding die in a state in which rectilinear magnetic lines of force disposed parallel to an axial line of the rotating shaft pass through; and forming a rotating main body portion integrally with the rotating shaft by a resin magnetic material to form a rotor with a main magnet portion, a thrust magnet portion, and other magnet portion being respectively polarized by magnetic-field molding.

Due to the above-described manufacturing method, the magnetic bodies within the resin magnetic material which forms the rotating main body portion can be made anisotropic in such a manner as to be uniformly arrayed in the predetermined direction, and therefore, efficient polarization can be effected in a subsequent polarization process.

A thirteenth aspect of the present invention is a method of manufacturing a motor described in the twelfth aspect, wherein permanent magnets are disposed at a position in the molding die with the cavity interposed between the permanent magnets so that a magnetic field is formed in which rectilinear magnetic lines of force disposed parallel to the axial line of the rotating shaft pass through the cavity.

Due to the above-described manufacturing method, the magnetic field is generated by using the permanent magnets. For this reason, as compared with the case in which the magnetic field is generated by using the coil, consumption of electric power and generation of heat do not occur, and therefore, a satisfactory molding process situation can be produced, and the manufacturing cost can also be reduced. Further, since the resin magnetic material can be made anisotropic efficiently, a complicated pattern can be easily formed even in the subsequent polarization process.

A fourteenth aspect of the present invention is a method of manufacturing a motor, comprising the steps of: supporting a rotor via a rotating shaft in a radial direction of the rotating shaft, the rotating shaft being disposed around a fixed shaft provided in a stator to form a dynamic-pressure bearing; providing a stator-side thrust magnet in the stator so that the rotor is supported with respect to the stator in a thrust direction of the rotating shaft; providing a rotor-side thrust magnet in the rotor correspondingly to the stator-side thrust magnet; and providing a rotating main body portion which is integrally formed by a resin magnetic material with respect to the rotating shaft of the rotor, in which a main magnet portion, an FG magnet portion for generating a speed-of-rotation detecting pulse which is integrally formed to be included in the main magnet portion or is formed separately, and a rotor-side thrust magnet portion serving as the rotor-side thrust magnet are respectively polarized at predetermined positions in the rotating main body portion, wherein the rotating main body portion is constructed in such a manner that: at least the main magnet portion is first polarized; and the thrust magnet portion is subsequently polarized.

Since polarization of the magnet portions is effected in the above-described order, interference of magnetic force can be prevented and the magnetic force required by each of the magnets can be reliably obtained. Further, the main magnet and the thrust magnet can be polarized in such a manner as to be disposed close to each other, and the magnets each having a small size and high magnetic force characteristics can be provided.

A fifteenth aspect of the present invention is a method of manufacturing a motor, comprising the steps of: disposing a polarization jig at a predetermined position on one side of a rotating main body portion which is integrally formed by a resin magnetic material to form a part of a rotor; and generating a magnetic field across adjacent poles of the polarization jig and polarizing the rotating main body portion with leakage of magnetic flux to a thrust magnet portion being restrained, thereby forming a main magnet portion.

By using the above-described method, it is possible to lessen magnetic flux leakage, prevent interference of magnetic force to the utmost, and obtain reliably the magnetic force required by the main magnet portion. Further, the main magnet portion and the thrust magnet portion can be formed to be close to each other. Accordingly, the rotating main body portion can be formed as the magnet having a small size and excellent magnet force characteristics.

A sixteenth aspect of the present invention is a method of manufacturing a motor, comprising the steps of: providing a limited portion at a predetermined position in a rotating main body portion which is integrally formed by a resin magnetic material to form a part of a rotor so that the limited portion is interposed between small end portions of a polarization jig; and polarizing the limited portion in a state in which a magnetic field concentrates therein and leakage of magnetic flux to a main magnet portion is set to the minimum, thereby forming a thrust magnet portion.

By using the above-described method, the magnetic force required by the thrust magnet portion is reliably obtained due to concentration of the magnetic field, the minimized magnetic flux leakage, and extremely restrained interference of the magnetic force. Further, the main magnet portion and the thrust magnet portion can be formed to be close to each other. Accordingly, the rotating main body portion can be formed as the magnet having a small size and excellent magnet force characteristics.

A seventeenth aspect of the present invention is a motor comprising: a rotor which is supported via a rotating shaft in a radial direction of the rotating shaft, the rotating shaft being disposed around a fixed shaft provided on the side of a stator to form a gas dynamic-pressure bearing; a stator-side thrust magnet disposed in the stator so as to support the rotor with respect to the stator in a thrust direction of the rotating shaft; a rotor-side thrust magnet disposed in the rotor; and a rotating main body portion mounted to the rotating shaft of the rotor and formed integrally by a resin magnetic material, in which a main magnet portion, an FG magnet portion for generating a speed-of-rotation detecting pulse, and a rotor-side thrust magnet portion serving as the rotor-side thrust magnet are respectively polarized at predetermined positions in the rotating main body portion.

Meanwhile, the gas dynamic-pressure bearing may be used in place of the dynamic-pressure bearing.

BRIEF DESCRIPTION OF THE DRAWINGS

FIG. 2 is a longitudinal cross-sectional view showing the disassembled state of the motor according to the first embodiment of the present invention with the side of a stator and the side of a rotor being separated from each other.

FIG. 17 is a bottom view of the rotor section of the optical deflector including the motor according to the sixth embodiment of the present invention.

FIG. 24 is a cross-sectional view taken along the lines XXIV—XXIV in FIG. 23, showing the structure of the projecting key portion provided in a portion of the grooves formed in the rotating shaft of the rotor section of the motor according to the seventh embodiment at the portion where the rotating main body portion is stuck to the rotating shaft.

FIG. 36 is a schematic longitudinal cross-sectional explanatory view, showing the state in which magnetic flux leakage increases, for explaining the polarization jig for polarizing the rotating main body portion in the rotor section of the optical deflector including the motor according to the tenth embodiment of the present invention.

DESCRIPTION OF THE PREFERRED EMBODIMENTS

A description will be hereinafter given, with reference to FIGS. 1 to 3, of a first embodiment of an optical deflector to which a motor according to the present invention is applied.

The optical deflector of the present invention is provided such that a polygon mirror is driven to rotate by a drive motor which is a coreless motor.

Figure 1:
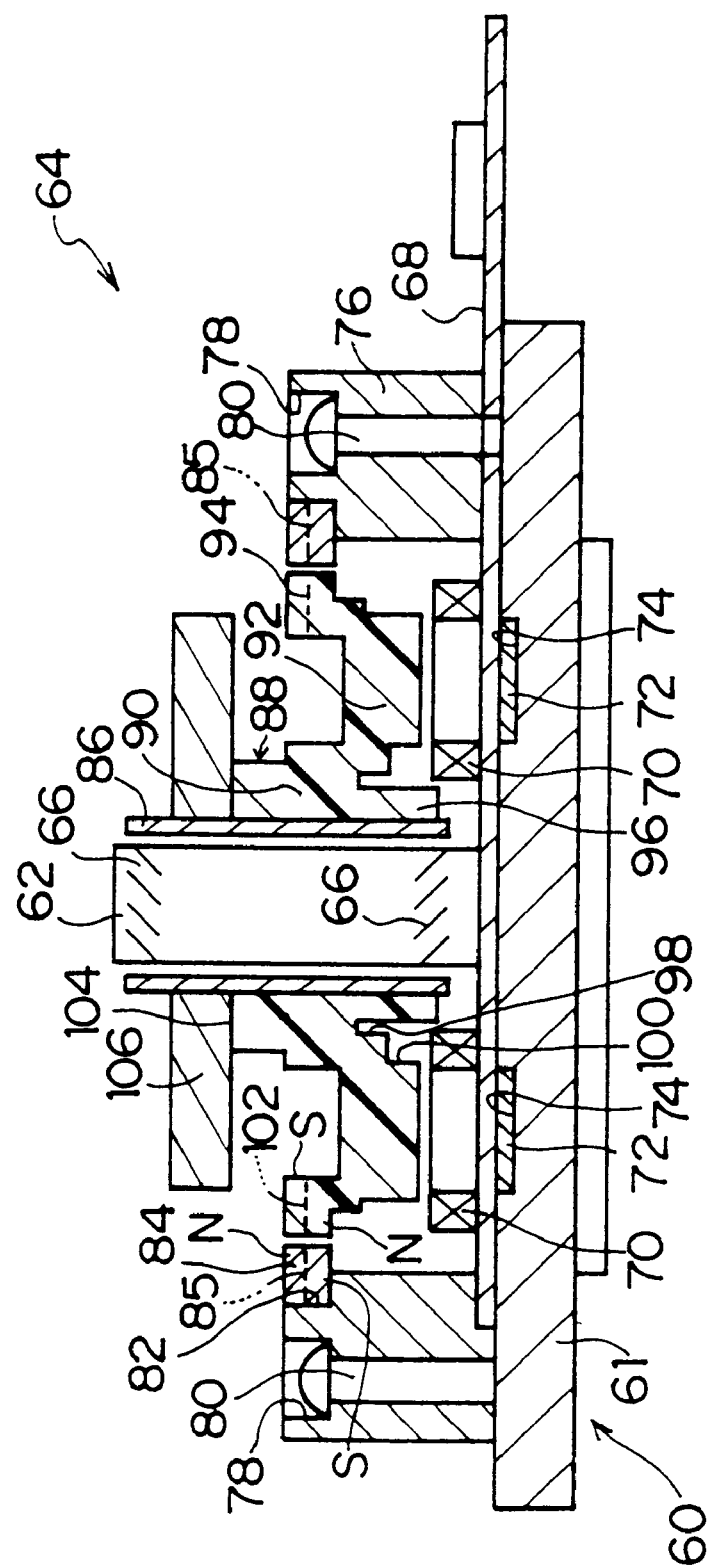
FIG. 1 is a longitudinal cross-sectional view showing an optical deflector to which a motor according to a first embodiment of the present invention is applied.

As shown in FIG. 1, the optical deflector is installed such that a rotor 64 is driven to rotate with respect to a fixed shaft 62 mounted on a base 61 disposed on the side of a stator 60. (Structure of stator)

A columnar fixed shaft 62 made of ceramic is formed upright at the central portion of the base 61 in the stator 60 and herringbone grooves which form a dynamic-pressure bearing are formed in the outer peripheral surface of the fixed shaft 62.

A control circuit substrate 68 having electronic components mounted thereon and controlling rotation of the rotor 64 is fixed onto the surface of the base 61 where the fixed shaft 62 is formed. Six drive coils 70 are disposed around the fixed shaft 62 at predetermined positions on the control circuit substrate 68.

Further, a yoke 72 is disposed at a position on the control circuit substrate 68, corresponding to the drive coil 70, on the side opposite to that where the base 61 is provided (i.e., at a lower side of the drive coil 70 as shown toward the front in FIG. 1) in such a manner as to be accommodated within a shallow groove 74 formed in the base 61. The yoke 72 is used to direct, toward the rotor 64, magnetic lines of force generated in each of the drive coils 70 and turned to the base 61.

As also shown in FIG. 2, a thrust magnet holder 76 is mounted onto the base 61 to form a thrust bearing of the rotor 64. The holder 76, which is made of aluminum, is formed to have a rectangular configuration with a circular opening provided at the center thereof and is positioned at a predetermined location on the base 61 in such a manner that a fastening member 80 passes through each of through holes 78 formed at four corner portions of the holder 76.

A stepped portion 82 having a cut with an L-shaped cross section is formed in a peripheral portion of the circular opening of the holder 76, and a stator-side thrust magnet 84 made of a nylon-resin magnetic material and formed in the shape of a ring having a rectangular cross-sectional configuration is stuck to the stepped portion 82 by an adhesive agent. One portion of the stator-side thrust magnet 84 on the side of the stator 60 from an intermediate line 85 indicated by the broken line in the direction of thickness of the magnet 84 is polarized to have an S pole and another portion thereof separated from the stator 60 is polarized to have an N pole.

(Structure of rotor)

As shown in FIGS. 1 and 2, the rotor 64 mounted to the stator 60 having the above-described structure is provided with a rotating shaft 86 made of ceramic.

The rotating shaft 86 is formed in the shape of a hollow cylinder and is disposed around the fixed shaft 62 of the stator 60 so that the fixed shaft 62 passes through the rotating shaft 86. The rotating shaft 86 is provided to form a radial bearing which is a dynamic-pressure bearing which allows generation of pressure with an ambient atmosphere led into a space between the fixed shaft 62 and the rotating shaft 86 due to high-speed rotation of the rotating shaft 86.

The rotating shaft 86 is pressure-inserted into a through hole formed at the center of a rotating main body portion 88 and the rotating shaft 86 and the rotating main body portion 88 are integrally fixed to each other. The rotating main body portion 88 is made of a resin magnetic material in which, for example, a ferritic magnetic material is mixed with nylon, so as to have a polar anisotropy for post polarization, and is also formed as a body of rotation with the shaft core of the rotating shaft 86 being disposed as the center. Namely, the rotating main body portion 88 includes a trunk portion 90 disposed around the rotating shaft 86, a main magnet portion 92 extending from the trunk portion 90 in the shaped of a flange, and a rotor-side thrust magnet portion 94 formed in the outermost peripheral portion of the rotating main body portion 88.

The trunk portion 90 is formed as a cylindrical portion fitted to the outer peripheral portion of the rotating shaft 86 and a portion of the trunk portion 90 on the side of the stator is formed in a cylindrical shape having a small thickness and is provided as an FG magnet portion 96 for generating a speed-of-rotation detecting pulse.

Figure 3:
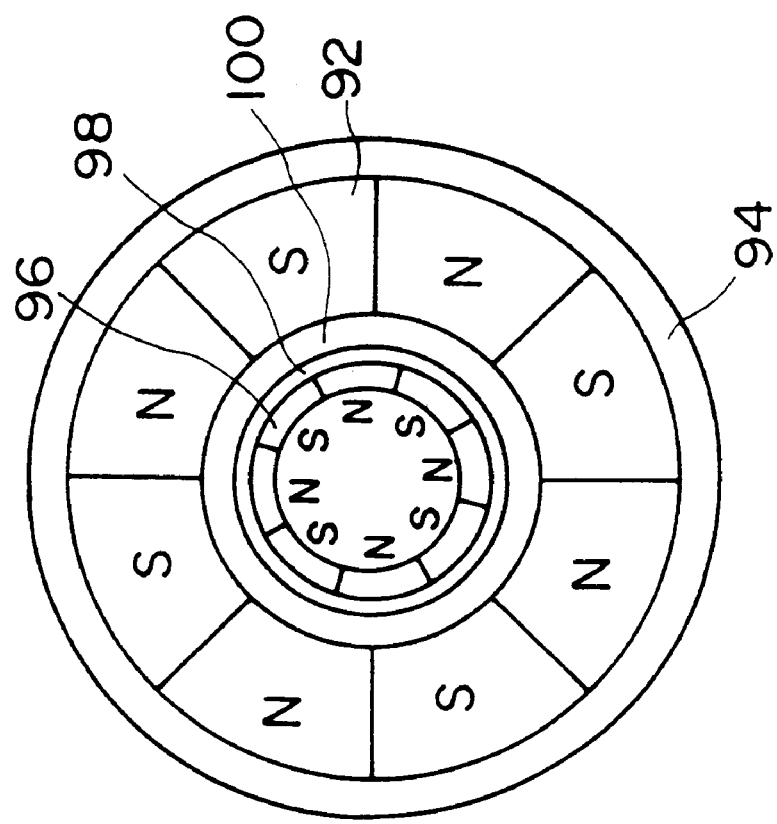
FIG. 3 is a bottom view showing a main magnet and an FG magnet provided on the side of the rotor in the optical deflector to which a motor according to the first embodiment and a ninth embodiment of the present invention is applied.

As shown in FIG. 3, the FG magnet portion 96 is divided into eight equal sections each at an angle of 45 degrees from the center and these sections are each polarized to have an N pole or an S pole such that adjacent sections have different poles.

As shown in FIGS. 1 and 2, the main magnet portion 92 of the rotating main body portion 88 is formed in the shape of a ring which extends in a stepped manner from the trunk portion 90 so as to be close to the drive coil 70 on the stator 60. Further, as shown in FIG. 3, the main magnet portion 92 are divided into eight equal sections and these sections are each polarized to have an N pole or an S pole such that adjacent sections have different poles. Returning to FIGS. 1 and 2, a portion of the main magnet portion 92 near the FG magnet portion 96 is formed as a wide slit portion 100 which continues from an open portion of a narrow slit portion 98 in a stepped manner, so that magnetic lines of force of the main magnet portion 92 do not affect magnetic lines of force of the FG magnet directed toward a position sensor (not shown).

An annular rotor-side thrust magnet portion 94 is formed integrally with an outer peripheral portion of the main magnet portion 92 in such a manner as to be separated from the side of the stator 60 in a stepped manner to extend outwardly. The rotor-side thrust magnet portion 94 is formed in the shape of a ring having a rectangular cross-sectional configuration. One portion of the rotor-side thrust magnet portion 94 on the side of the stator 60 from an intermediate line 102 indicated by the broken line in the direction of thickness of the rotor-side thrust magnet portion 94 is polarized to have an N pole, and another portion thereof separated from the stator 60 is polarized to have an S pole.

With the rotor-side thrust magnet portion 94 being disposed to be coaxial with the stator-side thrust magnet 84 fixed to the holder 76 of the stator 60 at a predetermined close interval therebetween, a thrust bearing for supporting the total weight of the rotor 64 in the thrust direction is formed by attractive force acting between the different poles of these magnets 84, 94. Meanwhile, the two magnets 84, 94 which form the thrust bearing can each adopt various polarization structures which cause attractive force to act therebetween. For example, the N pole and S pole of each of the magnets 84, 94 may be inverted, or the magnets 84, 94 may be formed such that adjacent peripheral surfaces thereof have different poles.

Further, an end surface of the trunk portion 90 of the rotating main body portion 88 in the rotor 64 on the side opposite to the base 61 is formed as a mounting surface 104 cut to be a surface which is perpendicular at high accuracy to the shaft core of the rotating shaft 86. A polygon mirror 106 whose outer-peripheral reflecting surfaces are each formed as a mirror finished surface is fixed onto the mounting surface 104.

In the optical deflector having the above-described structure, the rotor 64 is supported and received in the radial direction by a dynamic-pressure bearing acting between the fixed shaft 62 and the rotating shaft 86, and is also supported and received by the thrust bearing formed by using the stator-side thrust magnet 84 and the rotor-side thrust magnet 94.

As a result, excitation-switching control is effected for the six drive coils 70 by a control circuit of the control circuit substrate 68 and the rotor 64 is rotated in a floating state.

Figure 15:
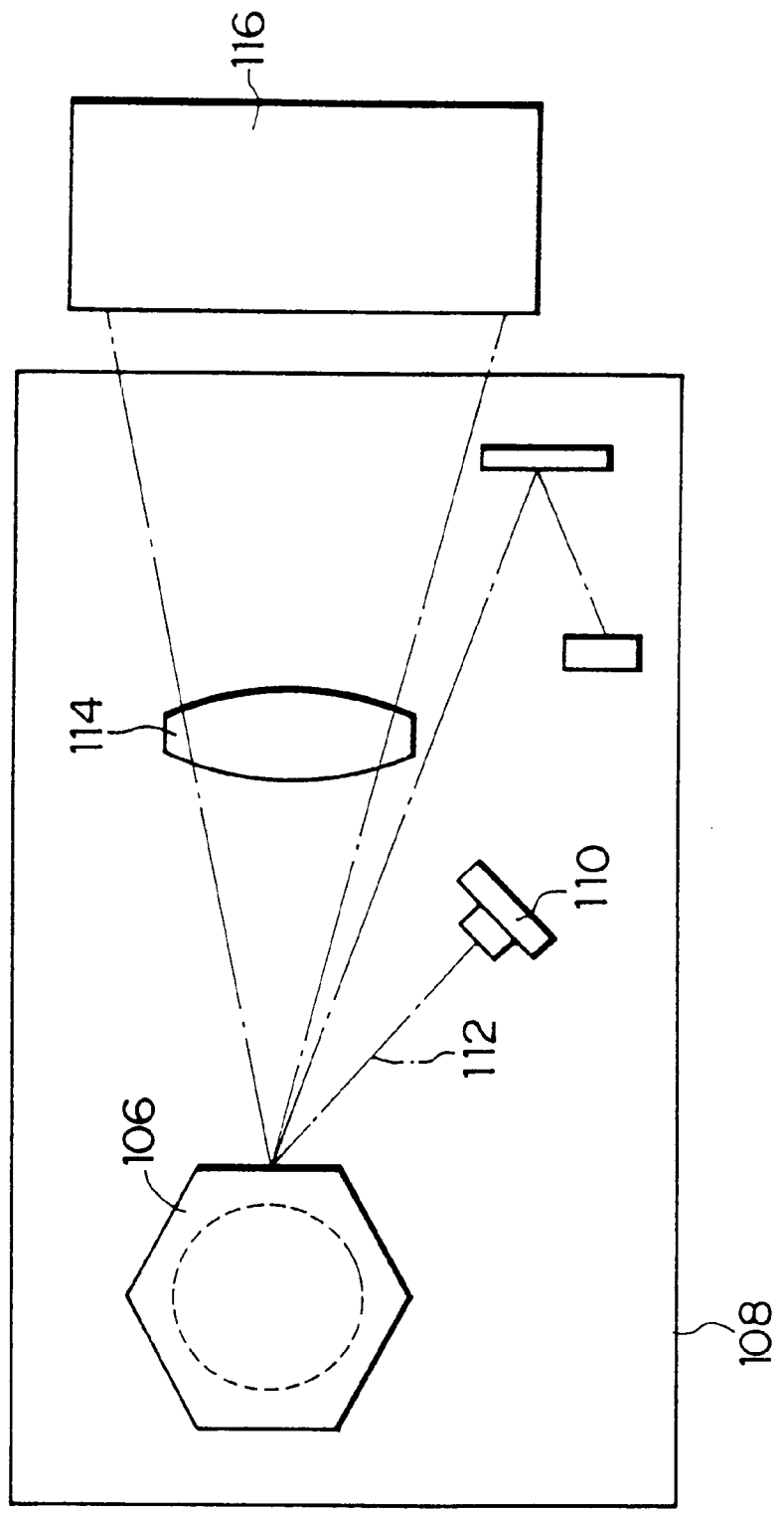
FIG. 15 is a plan view showing the state in which an optical deflector including the motor of the present invention is used in such a manner as to be installed in an optical scanning device.

The above-described optical deflector is used in such a manner as to be installed in, for example, an optical scanning device shown in FIG. 15.

The optical scanning device shown in FIG. 15 is constructed such that, with the optical deflector mounted to an optical box 108, the polygon mirror 106 is provided to face an inner space of the optical box 108 sealingly closed by a dust-proof cover. A laser beam 112 emitted from a light source 110 such as a semiconductor laser is illuminated on the polygon mirror 106 and the laser beam 112 scanned by the polygon mirror 106 is transmitted through an image forming lens 114 and through a dust-proof glass (not shown) so as to be formed as a proper image on an object to be scanned 116. As a result, an electrostatic latent image based on the generally used xerography is used, or a film is sensitized.

The optical deflector according to the first embodiment of the present invention has an integral structure in which predetermined portions of the integrated rotating main body portion 88 are each polarized to have a predetermined magnetic pole. Accordingly, this optical deflector has no conventional structure in which a flange and a magnet which are made of different materials and formed as separate parts are adhered to each other, and therefore, there is no possibility that adhered magnets are separated due to thermal stress caused by generation of heat during operation of a motor of the optical deflector or due to centrifugal stress caused by high-speed rotation of the rotor 64. As a result, the reliability of the optical deflector having the dynamic-pressure bearing can be improved.

Further, in the integral structure of the rotating main body portion 88, as compared with the conventional rotor structure in which each of magnets is stuck and fixed to an aluminum flange, the inertia of the rotor becomes small. For this reason, the initial imbalance weight can be lessened.

Figure 37:
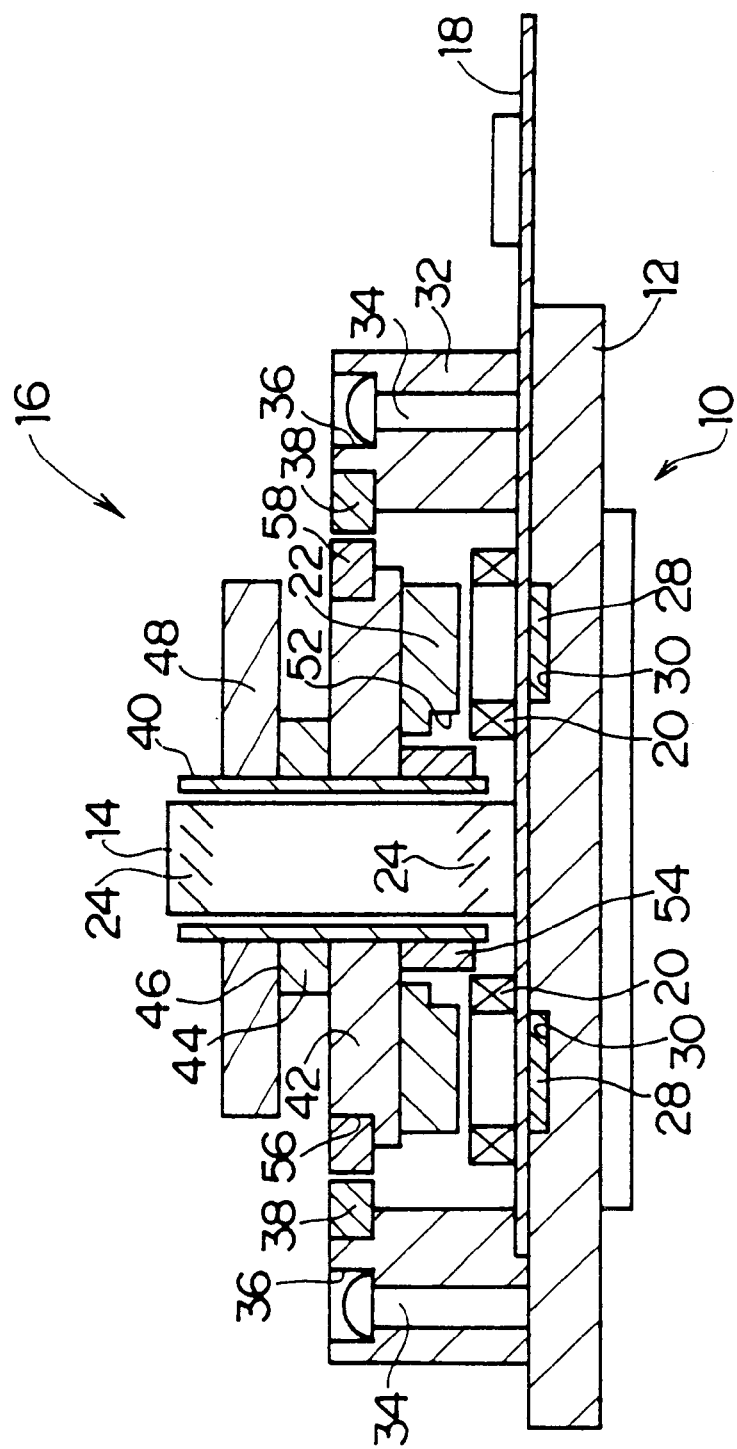
FIG. 37 is a longitudinal cross-sectional view showing the structure of an optical deflector in which a conventional motor is used.
Figure 38:
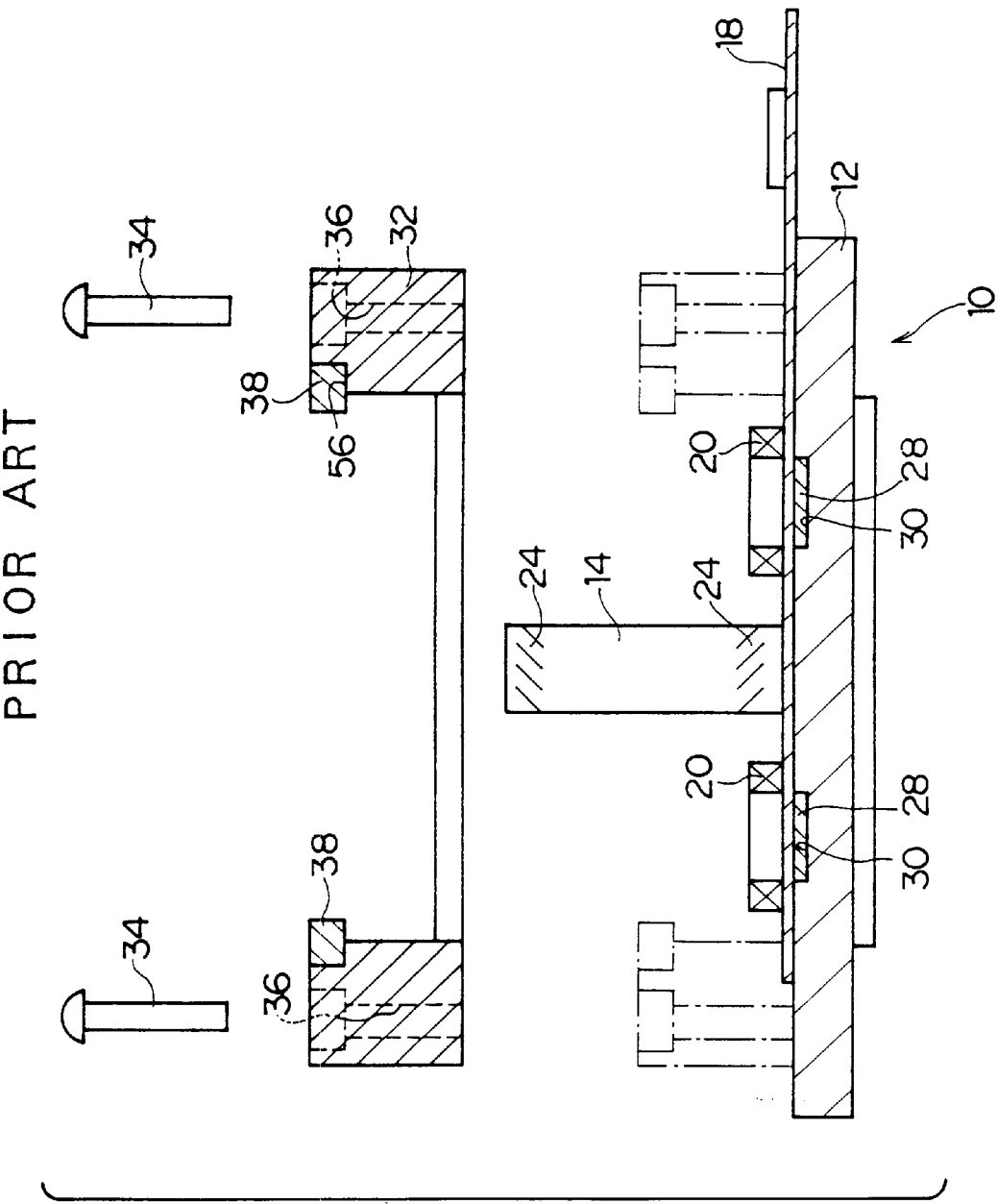
FIG. 38 is a longitudinal cross-sectional view showing the structure of a stator section of the conventional motor in a disassembled state.
Figure 39:
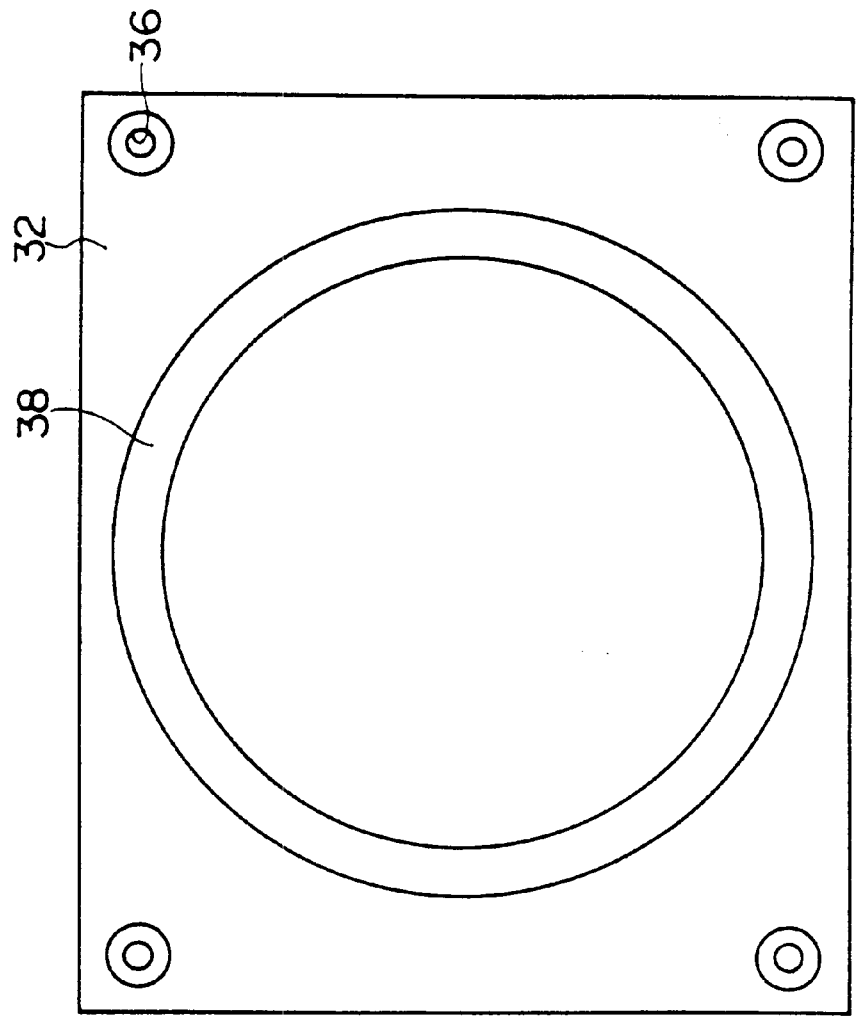
FIG. 39 is a plan view showing the structure including a holder of the stator and a stator-side thrust magnet in the conventional motor.
Figure 40:
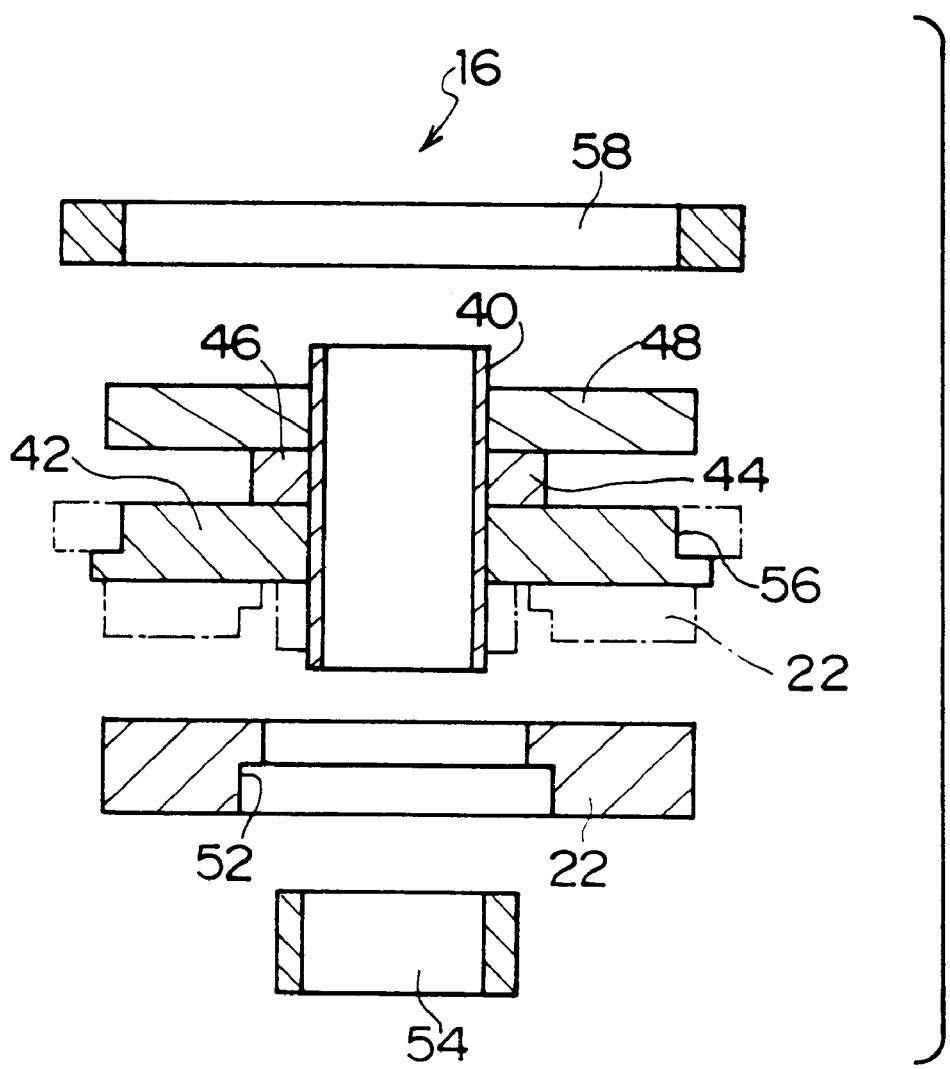
FIG. 40 is a longitudinal cross-sectional view showing the structure of a rotor section of the conventional motor in a disassembled state.
Figure 41:
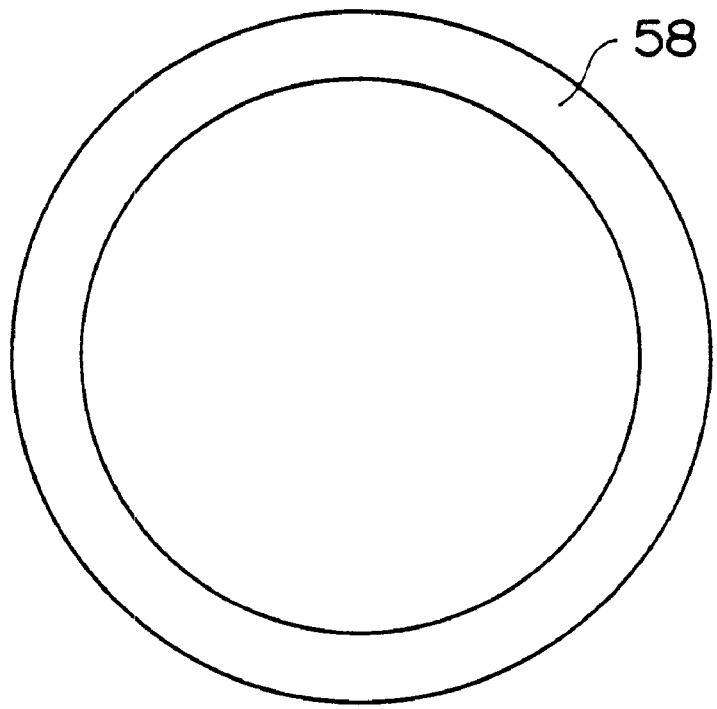
FIG. 41 is a plan view showing an inner thrust magnet of the conventional motor in a takeout state.
Figure 42:
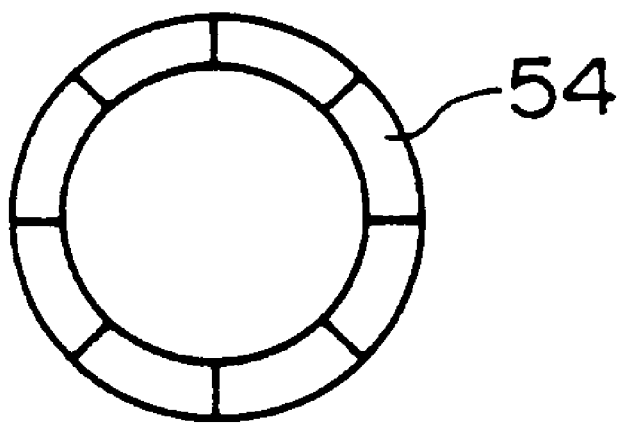
FIG. 42 is a bottom view showing an FG magnet of the conventional motor in a takeout state.
Figure 43:
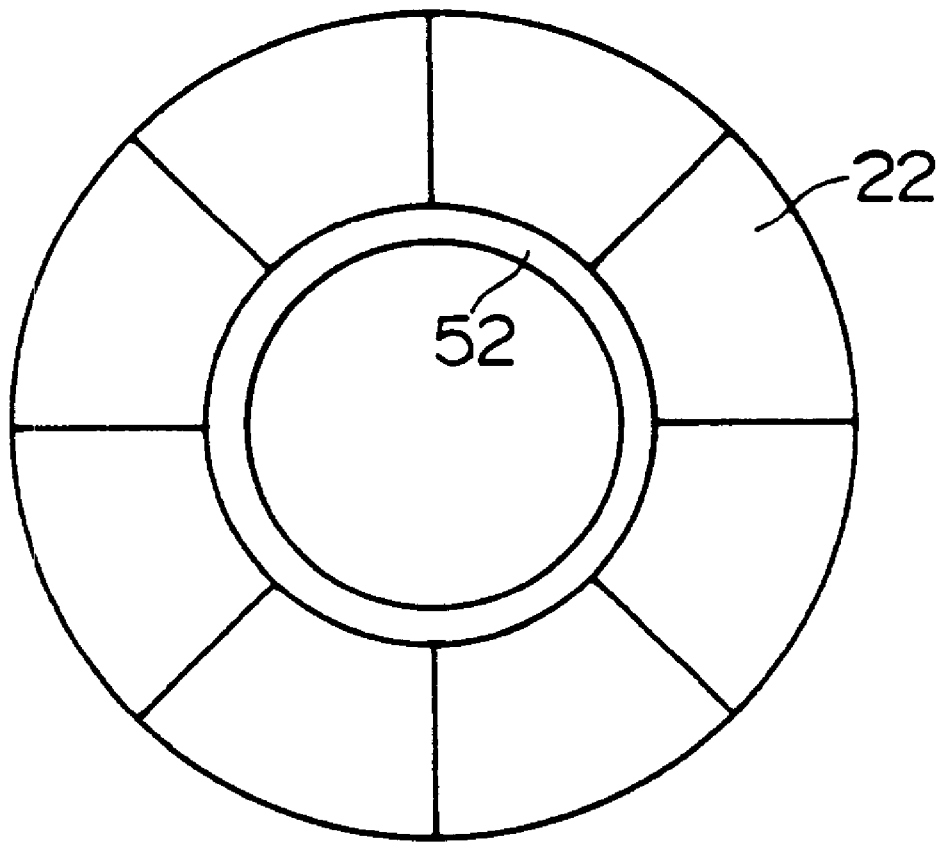
FIG. 43 is a bottom view showing a main magnet of the conventional motor in a takeout state.

The foregoing can be recognized from the results of Table 2 below, which indicate respective measured values of amplitude of the optical deflector having the integrated rotating main body portion 88 according to the first embodiment of the present invention and the optical deflector shown in FIG. 37 in which each of magnets is stuck to a flange.

TABLE 2

Amplitude values of aluminum flange-adhered rotor and integrated rotor

| aluminum flange-adhered rotor | | integrated rotor | |
|---|---|---|---|
| radial amplitude (nm) | thrust amplitude (nm) | radial amplitude (nm) | thrust amplitude (nm) |
| $3.4 \times 10^{-4}$ | $5.2 \times 10^{-4}$ | $1.0 \times 10^{-4}$ | $3.9 \times 10^{-4}$ |

15,000 rmp, 256 HZ, no balance correction

The above measured values are ones of amplitude with respect to vibration of 256 HZ when the optical deflector is rotated at the speed of rotation of 15,000 rpm with the rotor 64 being set in a state of no balance correction. As seen from these measured values, each amplitude in the radial direction and in the thrust direction in the optical deflector according to the first embodiment was recognized to be smaller than that in the conventional optical deflector.

Since the vibration is reduced as described above, no balance correction of the rotor is required in the case of a low-speed rotation. In this case, the operating efficiency can be improved with a balance correcting operation at the time of assembling and manufacturing being omitted. Further, it is possible to eliminate a magnet adhering operation including difficult management of an amount of adhesives, or the like, which has been required by a conventional system in which each of magnets is stuck to a flange, and a moderate-priced product can be provided accordingly.

Moreover, even when the rotor 64 is rotated at the speed of rotation of 10,000 rpm to 30,000 rpm or more, adverse effects on optical scanning caused by vibration, distortion of the rotor 64, or the like are not produced and stabilized optical scanning can be realized.

Figure 4:
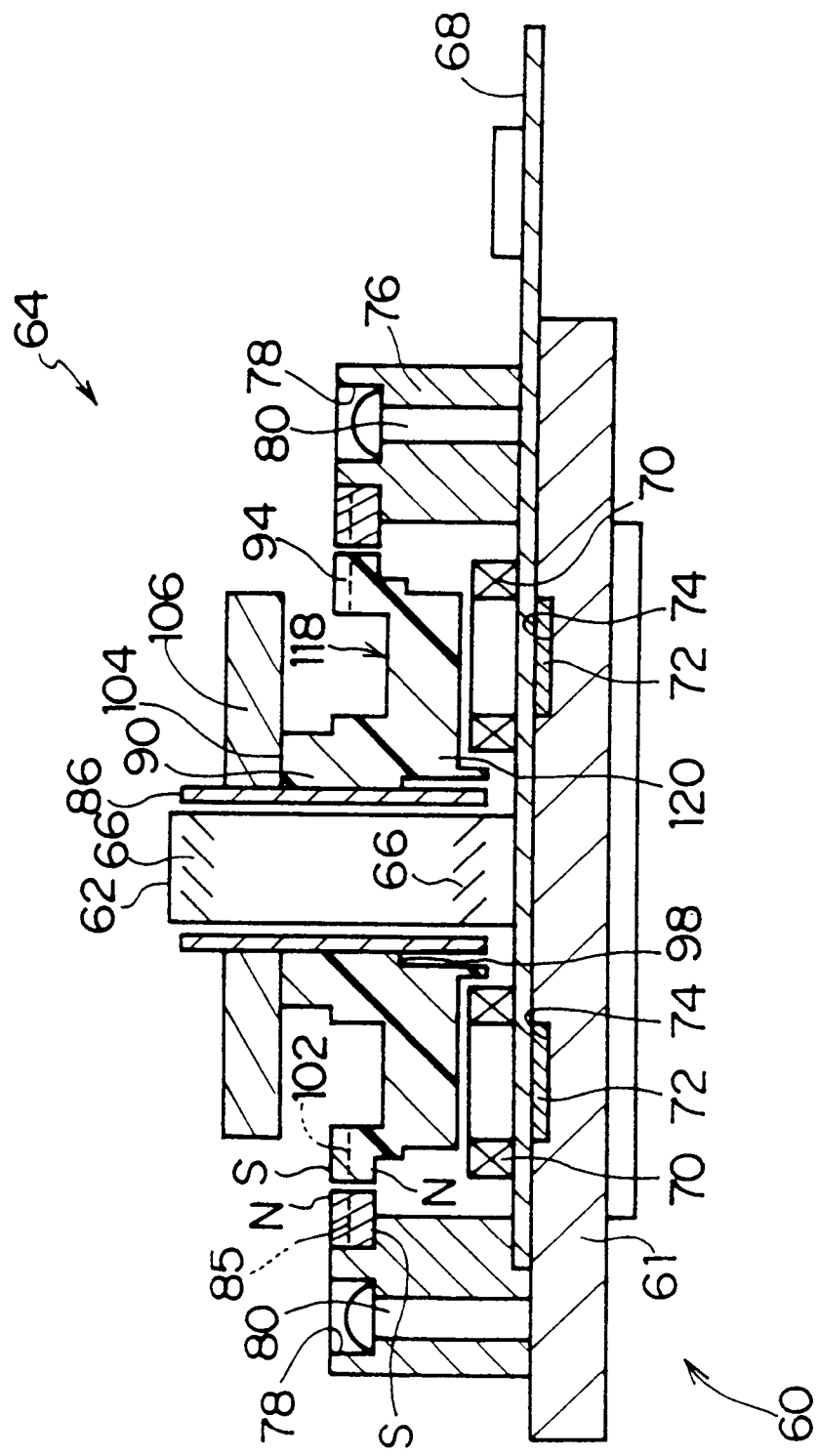
FIG. 4 is a longitudinal cross-sectional view showing an optical deflector to which a motor according to a second embodiment of the present invention is applied.
Figure 5:
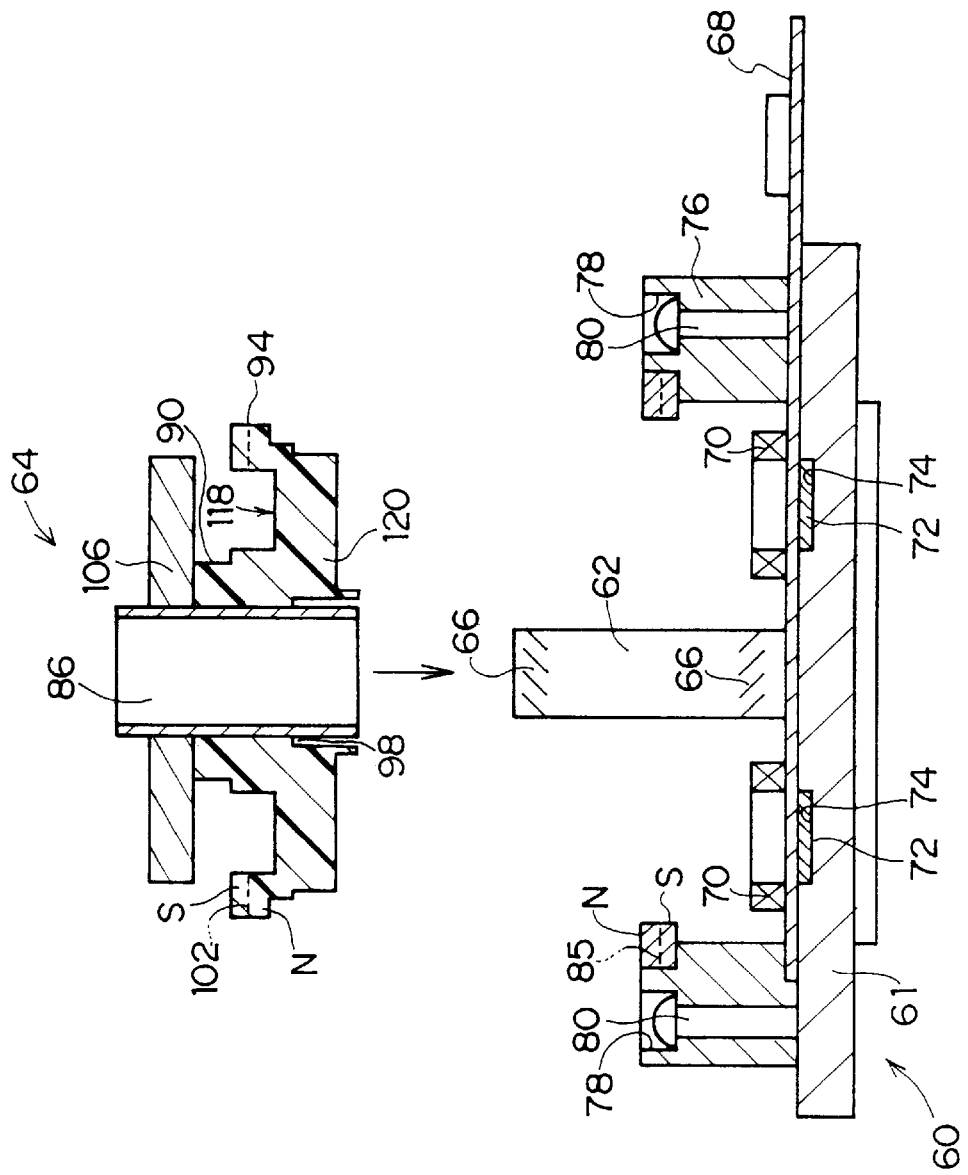
FIG. 5 is a longitudinal cross-sectional view showing the disassembled state of the motor according to the second embodiment of the present invention with the side of a stator and the side of a rotor being separated from each other.
Figure 6:
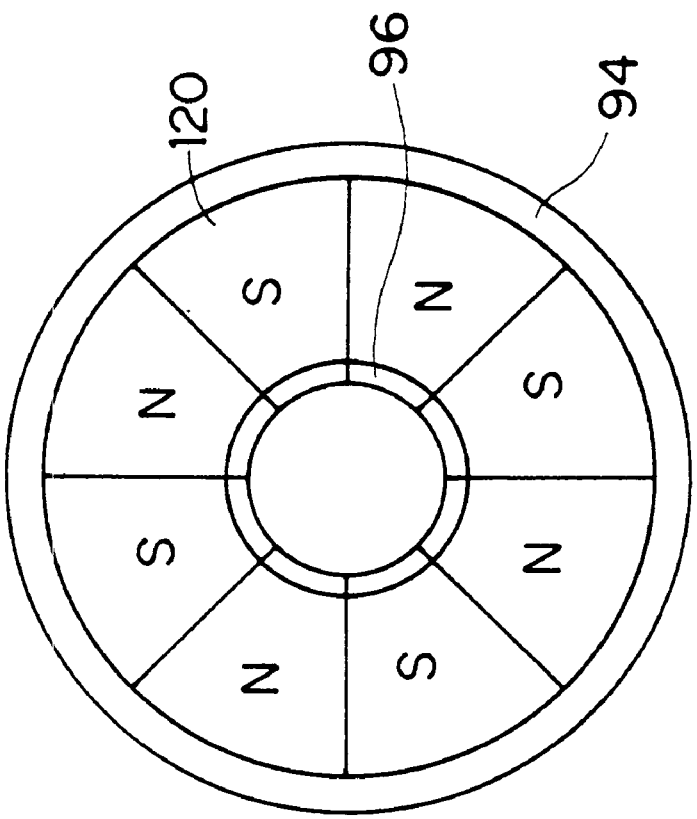
FIG. 6 is a bottom view showing a main/FG magnet provided on the side of the rotor in the motor according to the second embodiment of the present invention.

Next, a second embodiment of the present invention will be described with reference to FIGS. 4 to 6. The second embodiment is constructed such that the main magnet portion and the FG magnet portion of the rotating main body portion in the rotor 64 are integrally formed with each other.

A main/FG magnet portion 120 in the rotating main body portion 118 of the rotor 64 is formed in the shape of a ring whose transverse dimension is made large in such a manner as to extend, in a stepped manner, directly from a trunk portion 90 of the rotating main body portion 118 to be close to the drive coil 70 on the stator 60. As shown in FIG. 6, eight equal section of the main/FG magnet portion 120 separated each at an angle of 45 degrees from the center are each polarized to have an N pole or an S pole, which is used as a pole of the main magnet and the FG magnet, such that adjacent sections are polarized to have different poles. Further, as shown in FIGS. 4 and 5, a narrow slit portion 98 is formed between the main/FG magnet portion 120 and the rotating shaft 86.

Due to the above-described structure, the structure of the rotating main body portion 118 is simplified and the shape of the molding die is made simple, thereby allowing manufacturing at a low price. Further, the initial imbalance weight during molding is reduced and the rigidity of the rotating main body portion can be improved.

Meanwhile, other structures, operations, and effects of the second embodiment are same as those of the first embodiment, and therefore, the same members as those of the first to third embodiments are denoted by the same reference numerals, and a detailed description thereof will be omitted.

Next, a third embodiment of the present invention will be described with reference to FIGS. 7 and 8.

In the third embodiment, a base portion 122 is used in which a base, a holder, and a stator-side thrust magnet are formed integrally.

(Structure of stator)

The base portion 122 of the stator 60 is formed in an integrated manner by a resin magnetic material in which a ferritic magnetic material is mixed with nylon so as to have polar anisotropy. The base portion 122 is constructed in such a manner that a cylindrical holder portion 126 is integrally formed on the surface of a stator-side base pedestal portion 124 formed in the shape of a rectangular pedestal and a ring-shaped stator-side thrust magnet portion 128 is integrally formed at the end of the holder portion 126. In addition, the stator-side thrust magnet portion 128 is directly polarized to form a magnet.

Further, a columnar fixed shaft 62 made of ceramic is formed upright at a central position of the holder portion 126 on the stator-side base pedestal portion 124. A control circuit substrate 68 is disposed on the surface of the base pedestal portion 124 on the side where the holder potion 126 is formed and electronic components for controlling each rotation of the drive coils 70 and the rotor 64 are mounted on the control circuit substrate 68. In the above-described way, the stator 60 is constructed.

(Structure of rotor)

The rotor 64 rotatably mounted to the above-described stator 60 includes a rotating shaft 86 having the shape of a hollow cylinder.

The rotating shaft 86 is provided such that the fixed shaft 62 of the stator 60 passes through a hollow hole of the rotating shaft 86. When the rotating shaft 86 is rotated at high speed, a radial bearing which is a dynamic-pressure bearing is formed between the fixed shaft 62 and the rotating shaft 86.

A ring-shaped flange 130 made of aluminum is fixed by shrinkage fit at a predetermined position on the outer periphery of the rotating shaft 86. The flange 130 is provided with a mirror mounting portion 132 and the polygon mirror 106 is fixed onto a mounting surface 134 of the mirror mounting portion 132. The mounting surface 134 is formed to be perpendicular at high accuracy to the shaft core of the rotating shaft 86. Further, the polygon mirror 106 is formed in the shape of a polygonal prism and the side surface portion thereof is formed as a mirror finished surface.

Further, a driving main magnet 136 made of a nylon-resin magnetic material is stuck to the surface of the flange 130 on the side of the stator 60 at a position corresponding to the drive coil 70 by an adhesive agent. In the same way as in the aforementioned shown in FIG. 2, the main magnet 136 is entirely formed in the shape of a ring, and as also shown in FIGS. 7 and 8, a stepped opening peripheral portion 138 having an opening whose inner diameter is increased one step is formed in the central hole portion of the main magnet 136 on the side of the stator 60. Further, the main magnet 136 is divided into eight equal sections each at an angle of 45 degrees from the center and these eight sections are each polarized to have an N pole or an S pole such that adjacent sections have different poles.

An FG magnet 140 for generating a speed-of-rotation detecting pulse, having a small cylindrical shape and made of a nylon-resin magnetic material, is stuck by an adhesive agent to a portion of the rotating shaft 86 projecting from the flange 130 to the side of the stator 60 such that one end surface of the FG magnet 140 is stuck to the flat surface of the flange 130. The FG magnet 140 is divided into eight equal sections each at an angle of 45 degrees from the center and these sections are each polarized to have an N pole or an S pole such that the adjacent sections have different poles.

A stepped portion 142 having an annular cut of a rectangular cross section is formed in the peripheral corner portion on the outer periphery of the flange 130 on the side opposite to the stator 60 and a ring-shaped rotor-side thrust magnet 144 made of a nylon-resin magnetic material is stuck to the stepped portion 142 by an adhesive agent.

Figure 7:
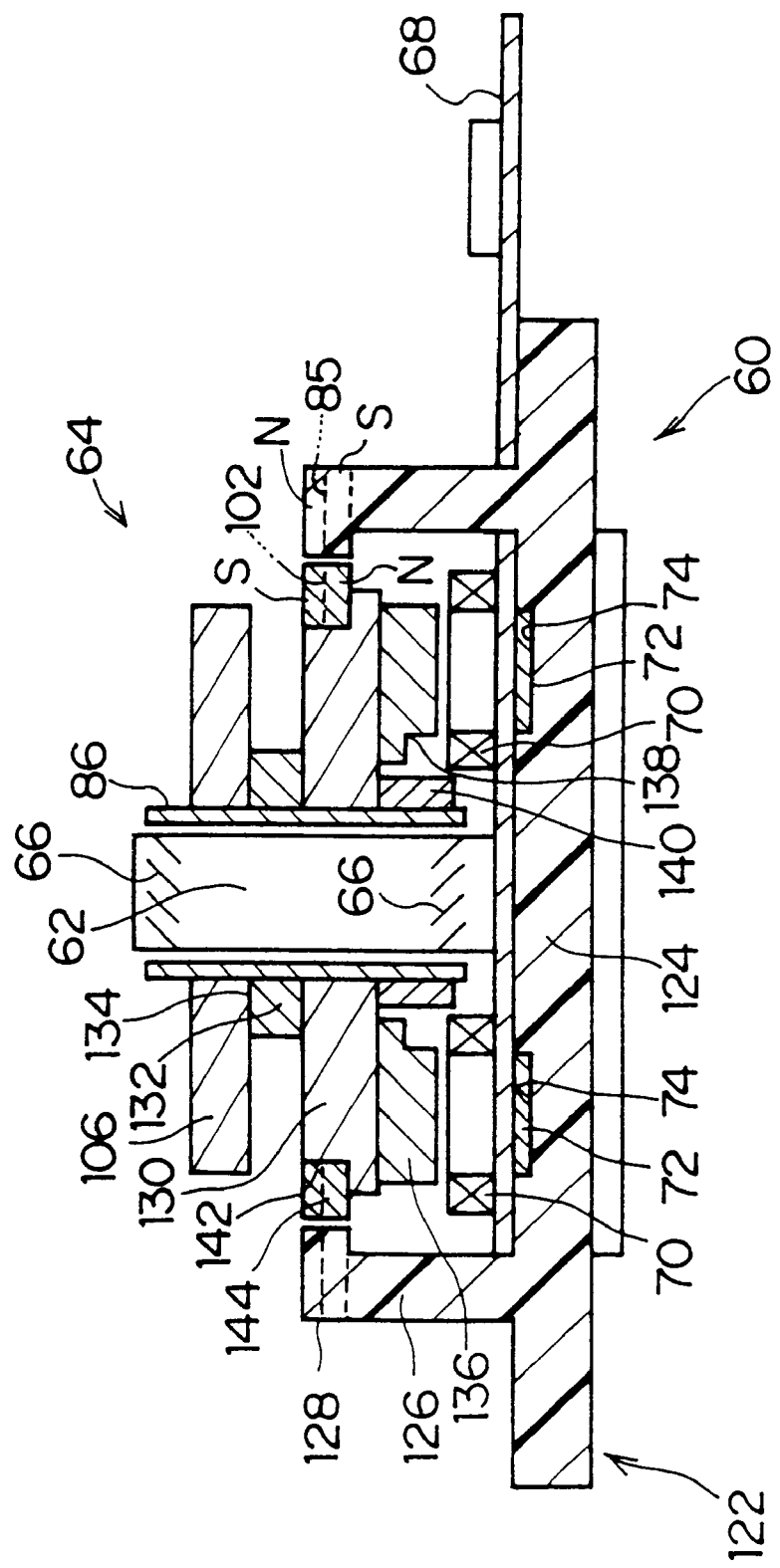
FIG. 7 is a longitudinal cross-sectional view showing an optical deflector to which a motor according to a third embodiment of the present invention is applied.
Figure 8:
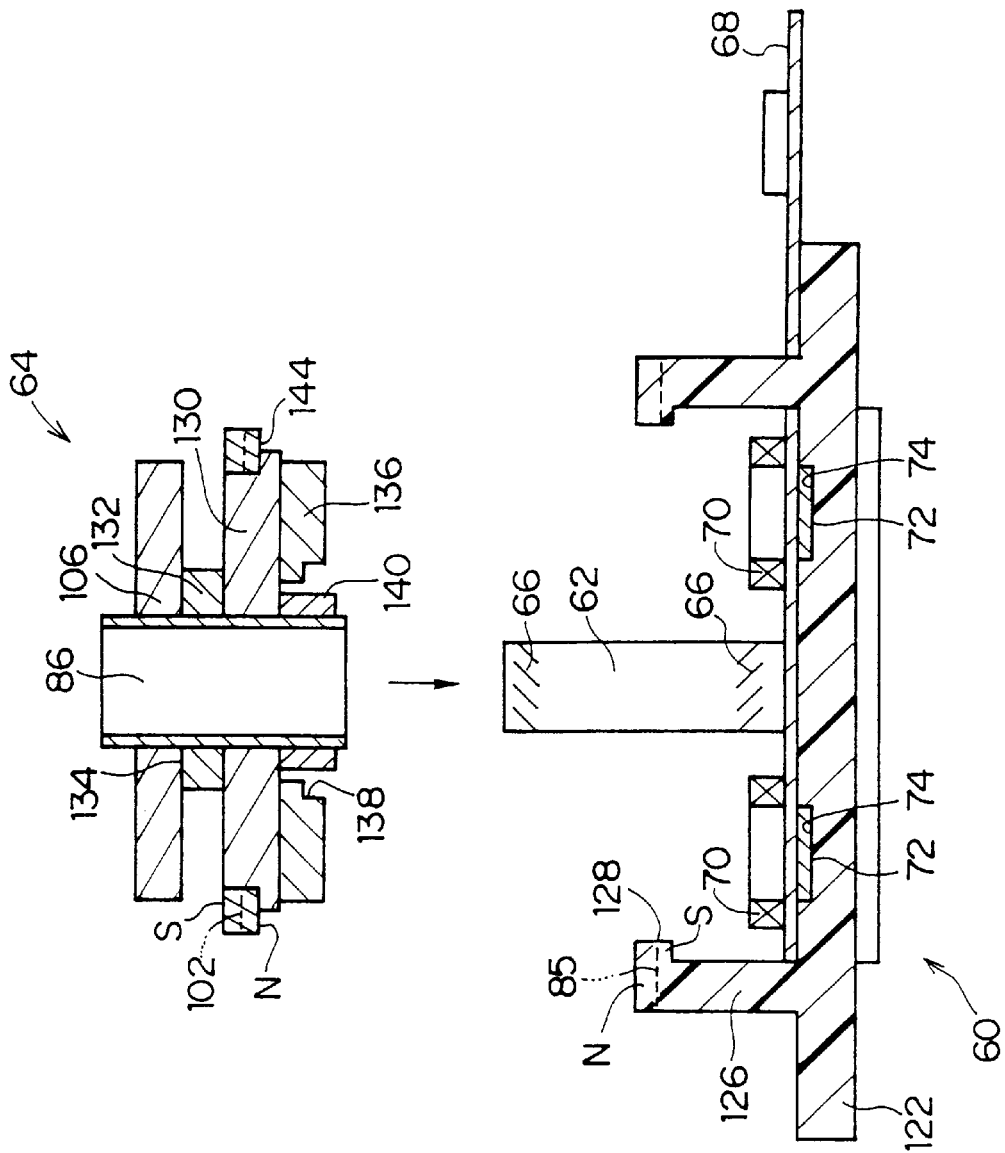
FIG. 8 is a longitudinal cross-sectional view showing the disassembled state of the motor according to the third embodiment of the present invention with the side of a stator and the side of a rotor being separated from each other.

As shown in FIG. 7, the rotor-side thrust magnet 144 is disposed to be coaxial with the stator-side thrust magnet 128 and these magnets 144, 128 are disposed adjacently at a predetermined interval therebetween. The outer peripheral surface of the rotor-side thrust magnet 144 and the inner peripheral surface of the stator-side thrust magnet 128 are polarized to have different poles so that attractive force acts therebetween, and a thrust magnetic bearing is thereby formed. The thrust magnetic bearing operates to float the rotor 64 entirely with the attractive force acting between these magnets 128, 144 surpassing load of a thrust direction (axial direction) in the rotating shaft 86 of the rotor 64.

For this reason, the rotor 64 is supported and received in the thrust direction by the thrust magnetic bearing and is also supported and received by the dynamic-pressure bearing in the radial direction. As a result, the excitation-switching control is effected for the six drive coils 70 by the drive circuit of the control circuit substrate 68 and the rotor 64 can be rotated at high speed in a state of floating in the air.

As described above, in the third embodiment, the base portion 122 is used in which the stator-side base pedestal portion 124, the holder portion 126, and the stator-side thrust magnet portion 128 are integrally formed. Accordingly, an adhering portion at which the holder and the stator-side thrust magnet which are formed separately are stuck together by an adhesive agent as in the conventional structure is not required, and therefore, there is no possibility that the adhering portion is separated due to thermal stress caused by generation of heat during the operation of the motor in the optical deflector so that the rotation of the rotor is prevented. As a result, the reliability of the optical deflector having the dynamic-pressure bearing can be improved.

Further, the third embodiment of the present invention is constructed in that the base pedestal portion 124, the holder portion 126, and the stator-side thrust magnet portion 128 are integrally formed. Accordingly, during assembling and manufacturing of the optical deflector, high-accurate assembling adjustment of the concentricity of the fixed shaft 62 formed upright on the base portion 122 and the stator-side thrust magnet portion 128 is not required. For this reason, the assembling operation can be easily effected and the number of assembling processes can be reduced, and therefore, a moderate-priced product can be provided.

Meanwhile, other structures, operations, and effects of the third embodiment are the same as those of the first embodiment, and therefore, the same members as those shown in FIGS. 1 through 3 are denoted by the same reference numerals, and a detailed description thereof will be omitted.

Figure 9:
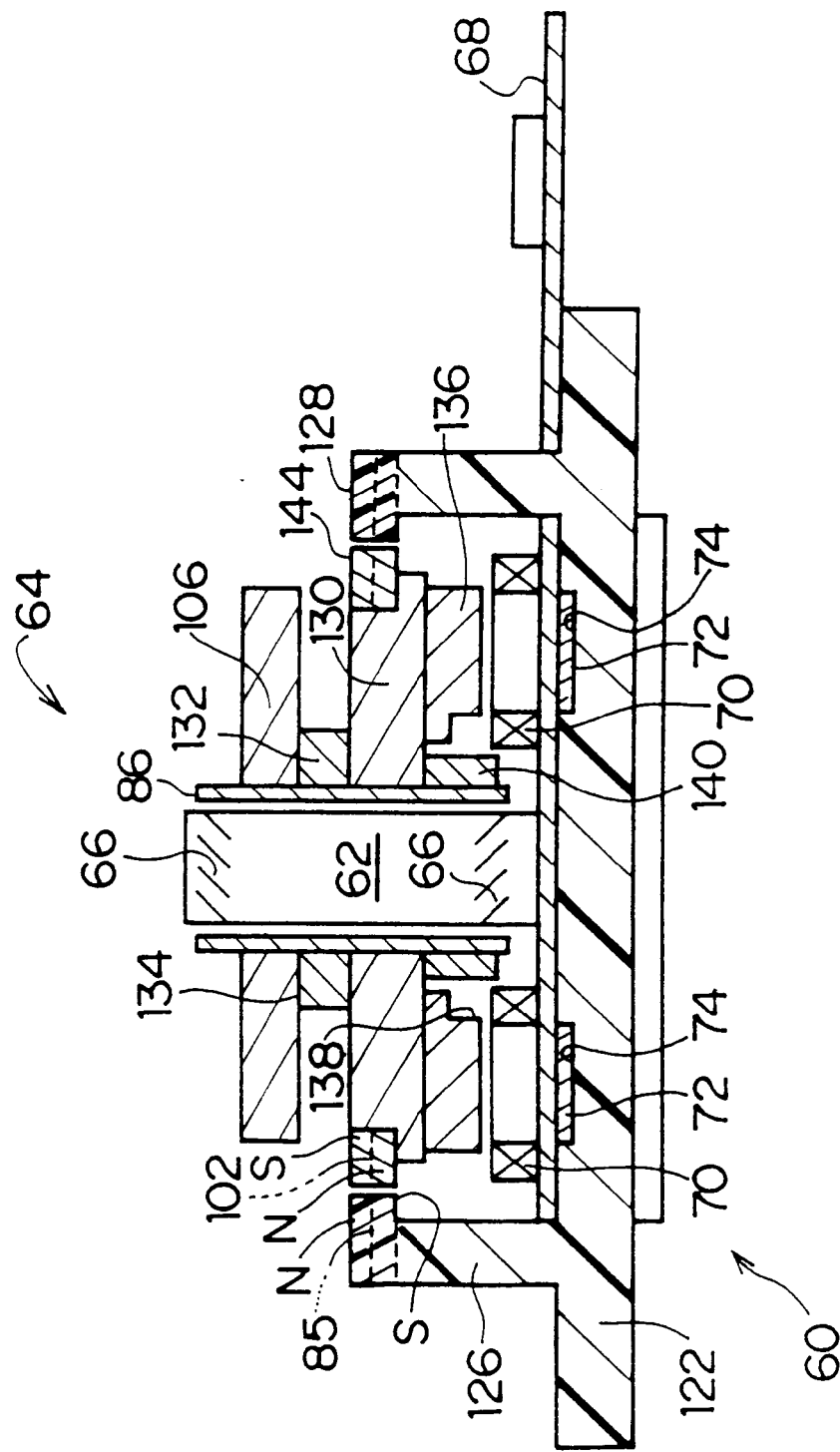
FIG. 9 is a longitudinal cross-sectional view showing an optical deflector to which a motor according to a fourth embodiment of the present invention is applied.
Figure 10:
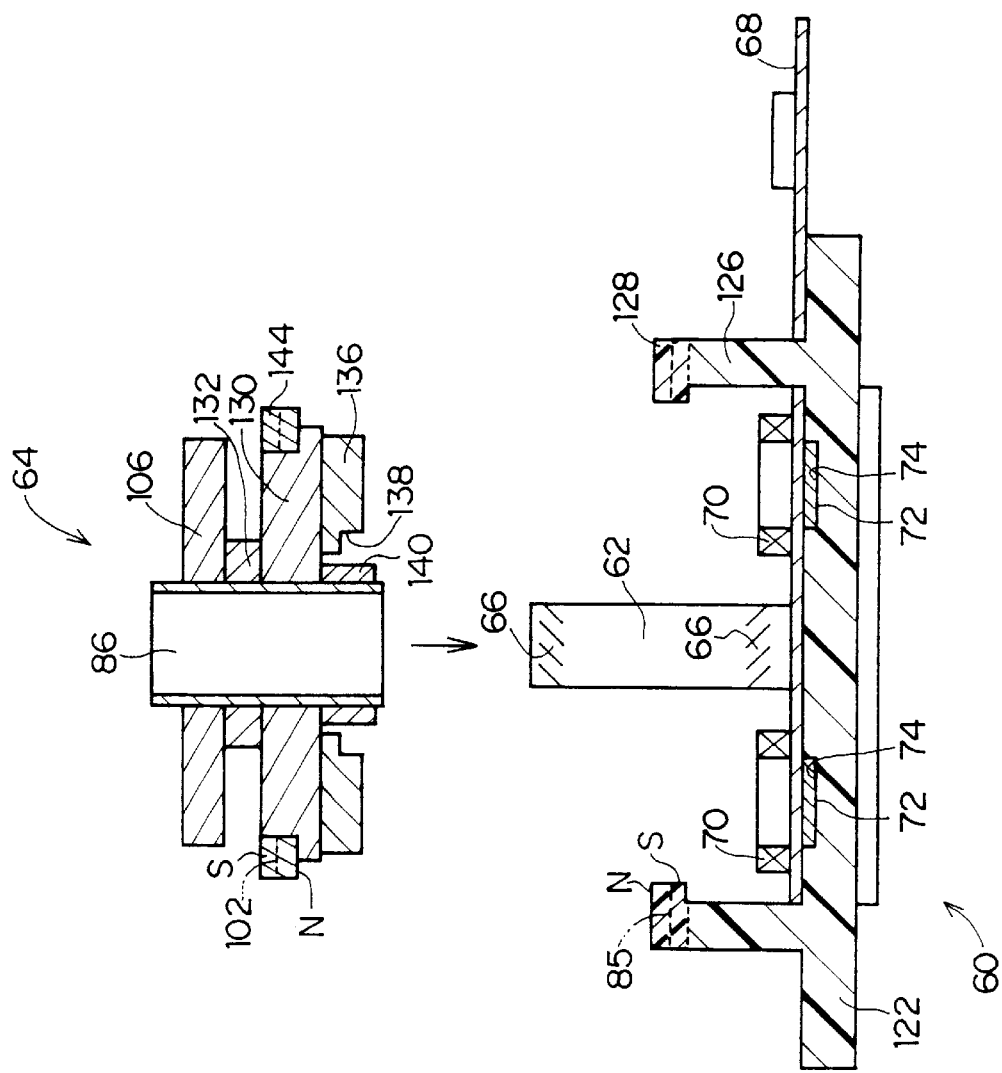
FIG. 10 is a longitudinal cross-sectional view showing the disassembled state of the motor according to the fourth embodiment of the present invention with the side of a stator and the side of a rotor being separated from each other.

Next, a fourth embodiment of the present invention will be described with reference to FIGS. 9 and 10.

In the fourth embodiment, a base portion of the stator 60 is formed in an integrated manner by a two-color injection molding machine which shares one mold or die, a two-color extruding machine, or two-color molding means for forming a two-color integrally molded product. Namely, the base portion 122 is entirely formed in an integrated manner by two-color molding means such that a region including the stator-side base pedestal portion 124 and the holder 126 is made of a non-magnetic resin material and a region of the stator-side thrust magnet portion 128 is made of a resin magnetic material in which a ferritic magnetic material is mixed with nylon. Further, the stator-side thrust magnet portion 128 is formed to have a polar anisotropy, and thereafter, is directly polarized.

Since the base portion 122 is formed as described above, it is not necessary that an expensive resin magnetic material is used for the large-volume portion formed by the stator-side base pedestal portion 124 and the holder portion 126. For this reason, an amount of the resin magnetic material to be used is extremely reduced, and a moderate-priced product can be provided.

Meanwhile, other structures, operations, and effects of the fourth embodiment of the present invention are the same as those of the first or third embodiment. Therefore, the same members as those shown in FIGS. 1 to 3 or FIGS. 7 and 8 are denoted by the same reference numerals, and a detailed description thereof will be omitted.

Figure 11:
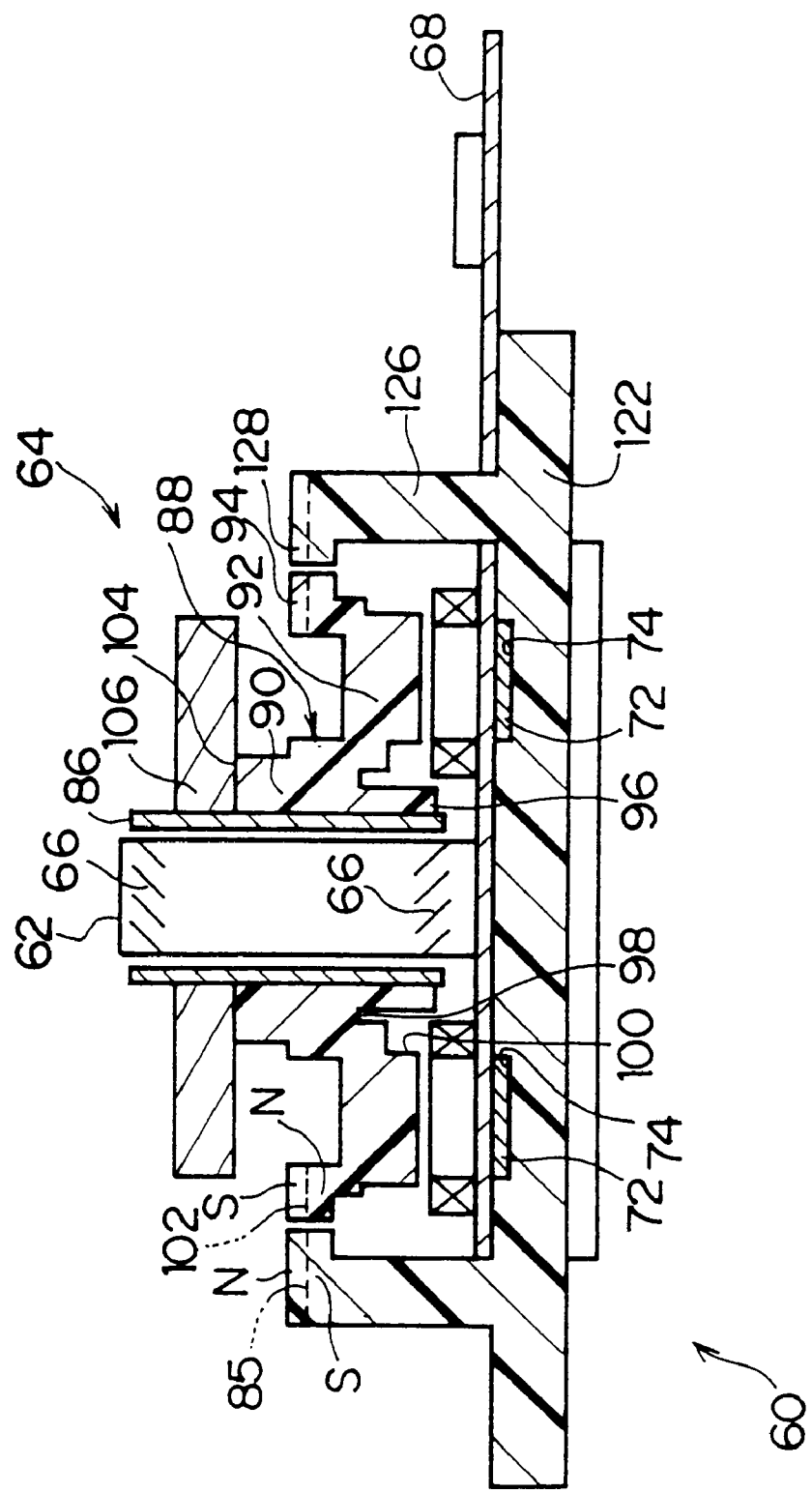
FIG. 11 is a longitudinal cross-sectional view showing an optical deflector having a structure in which the rotor in the motor according to the first embodiment and the stator in the motor according to the third embodiment are combined.

Next, examples of various combinations of the structures of the first to fourth embodiments of the present invention will be described. In the example shown in FIG. 11, an optical deflector in which the rotor 64 in the first embodiment and the stator 60 in the third embodiment are combined is provided.

Figure 12:
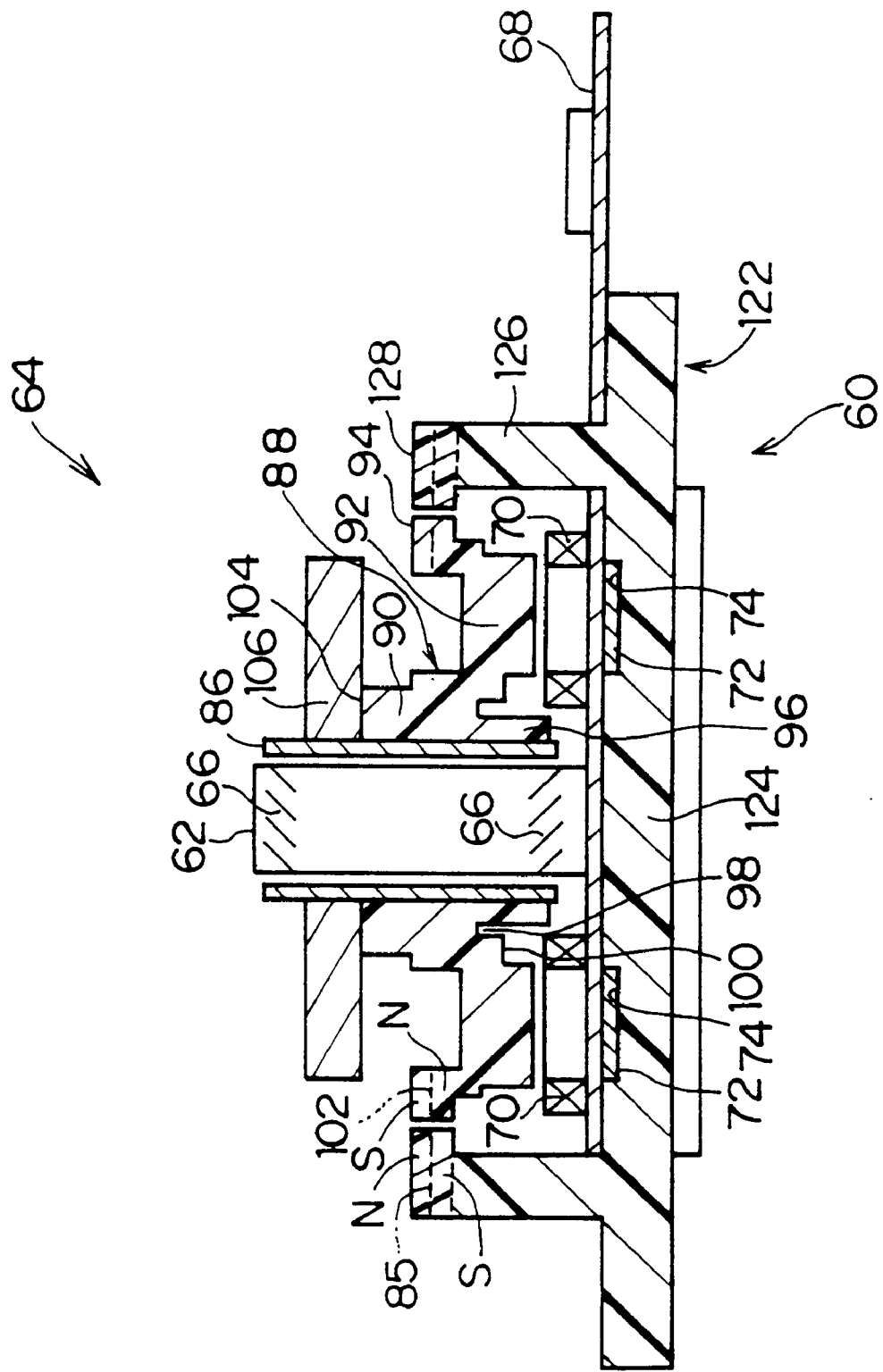
FIG. 12 is a longitudinal cross-sectional view showing an optical deflector having a structure in which the rotor in the motor according to the first embodiment and the stator in the motor according to the fourth embodiment are combined.

In the example shown in FIG. 12, an optical deflector in which the rotor 64 in the first embodiment and the stator 60 in the fourth embodiment are combined is provided.

Figure 13:
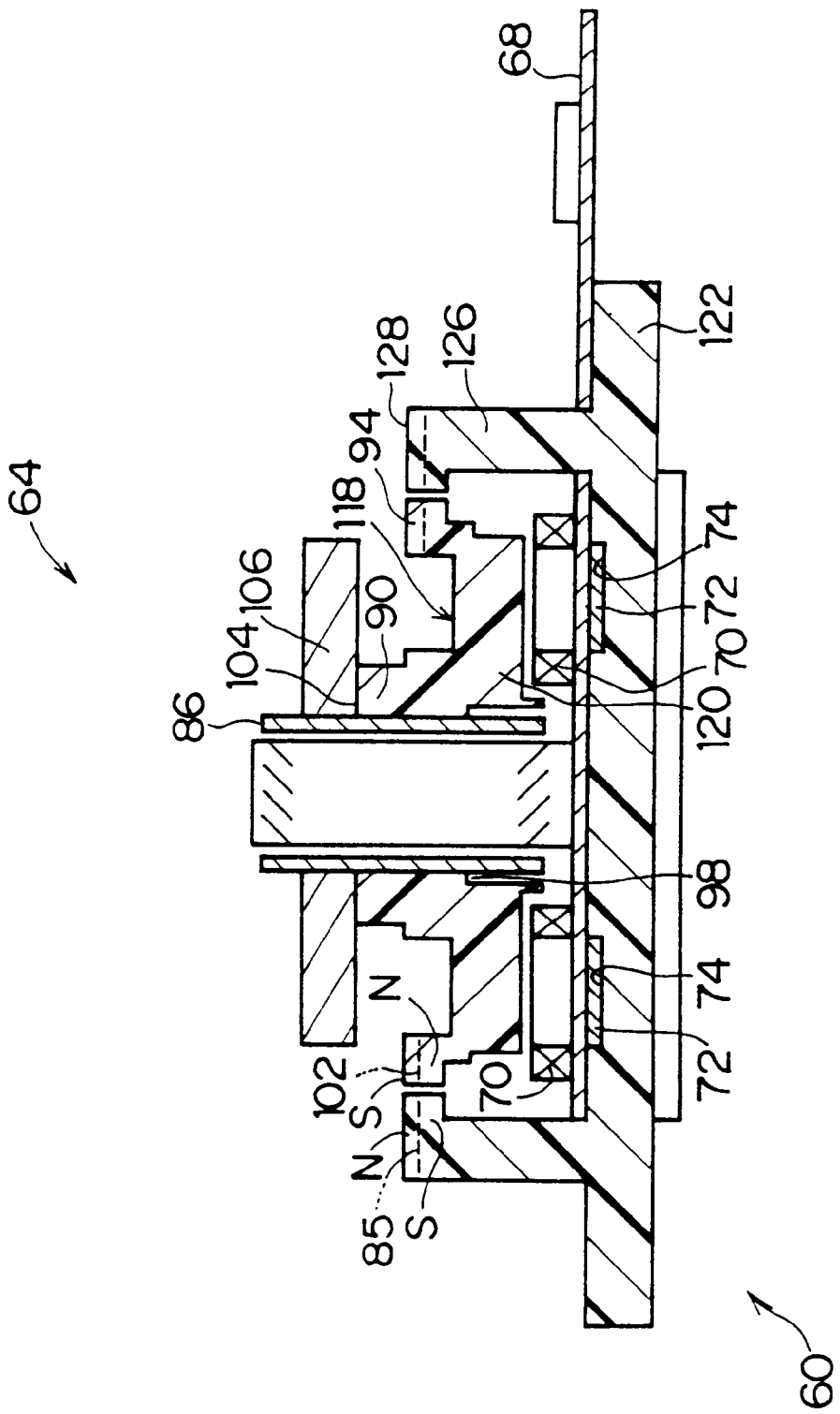
FIG. 13 is a longitudinal cross-sectional view showing an optical deflector having a structure in which the rotor in the motor according to the second embodiment and the stator in the motor according to the third embodiment are combined.

In the example shown in FIG. 13, an optical deflector in which the rotor 64 in the second embodiment and the stator 60 in the third embodiment are combined is provided.

Figure 14:
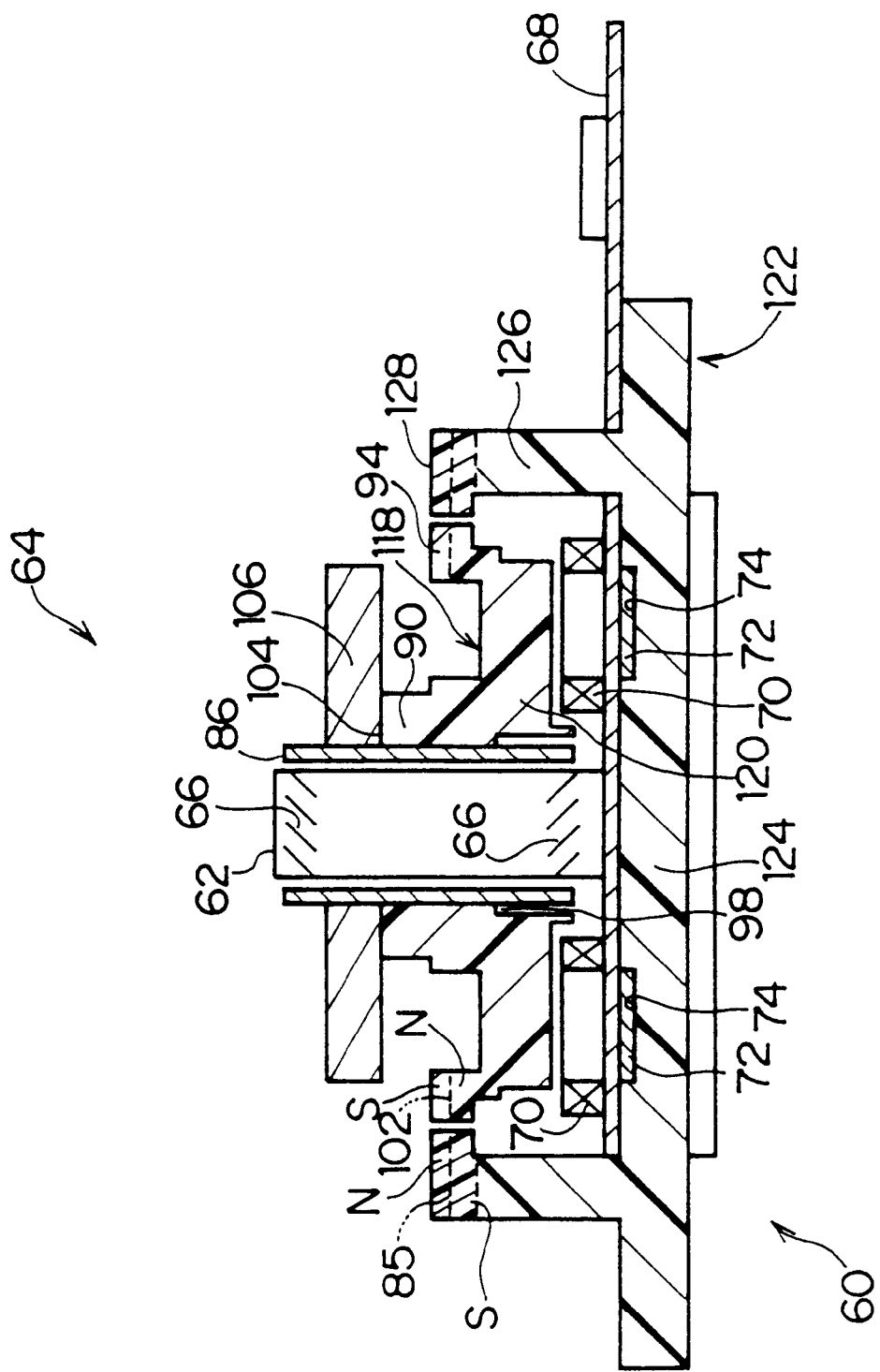
FIG. 14 is a longitudinal cross-sectional view showing an optical deflector having a structure in which the rotor in the motor according to the second embodiment and the stator in the motor according to the fourth embodiment are combined.

In the example shown in FIG. 14, an optical deflector in which the rotor 64 in the second embodiment and the stator 60 in the fourth embodiment are combined is provided.

In each of the optical deflectors formed to have the above-described combinations, the reliability of the optical deflector can be further improved by combining respective effects obtained in the stator 60 and the rotor 64 and greater reduction in cost can be achieved.

Next, a fifth embodiment of the present invention will be described. In the fifth embodiment, the base portion 122 of the stator 60 and the rotating main body portions 88, 118 of the rotor 64, which are each formed in an integrated manner by the resin materials, are respectively improved in strength. Namely, in order that the resin materials used for integral formation of each of the base portion 122 and the rotating main body portions 88, 118 have heat-resisting properties and also have improved rigidity and strength, a required amount of reinforcing material such as a glass fiber is added to the resin materials. As a result, even generation of heat occurs due to high-speed rotation of the rotor 64, deformation and breaking of the base portion 122 or the rotating main body portions 88, 118 can be prevented. At the same time, even a large centrifugal force acts on the rotating main body portions 88, 118 of the rotor 64 due to the high-speed rotation of the rotor 64, the deformation and breaking of the rotating main body portions 88, 118 can be prevented. Accordingly, the reliability of the optical deflector can be improved still further.

Meanwhile, other structures, operations, and effects of the fifth embodiment of the present invention are the same as those of the first to fourth embodiments, and a detailed description thereof will be omitted.

Figure 16:
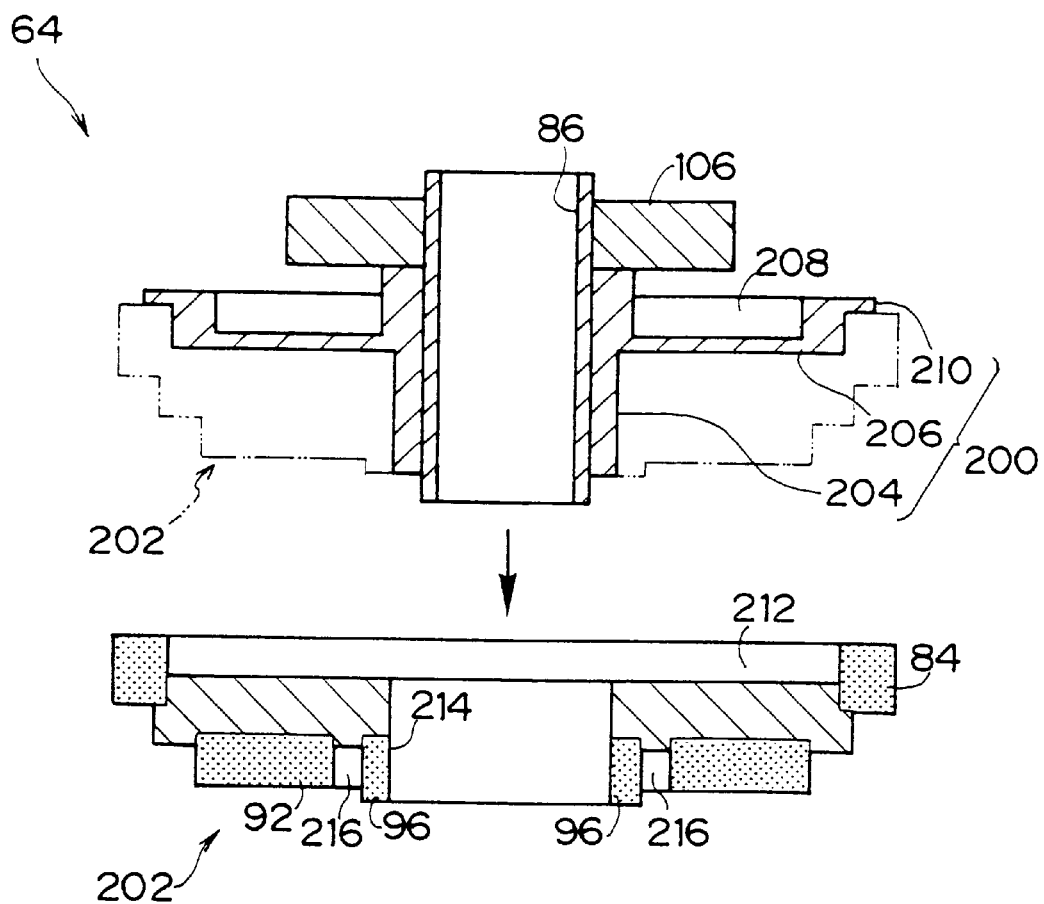
FIG. 16 is a longitudinal cross-sectional view showing, in a disassembled state, a rotor section of an optical deflector to which a motor according to a sixth embodiment of the present invention is applied.
Figure 18:
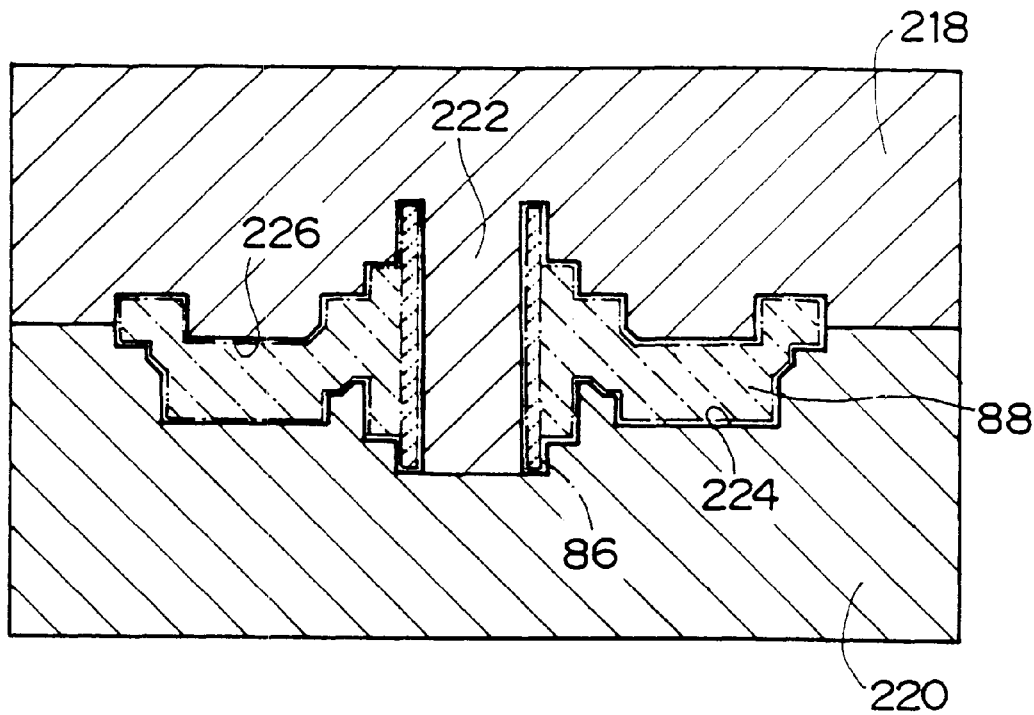
FIG. 18 is a longitudinal cross-sectional view showing a method in which a rotating main body portion of a rotor section of an optical deflector including a motor according to a seventh embodiment of the present invention is manufactured by insert injection molding.

Next, a description will be given of a sixth embodiment of the present invention with reference to FIGS. 16 and 17. In the sixth embodiment, the rotating main body portion of the rotor 64 is formed by using a flange portion made of aluminum. For this reason, the rotor 64 is formed by using the rotating shaft 86, the polygon mirror 106, a flange portion 200, and a compound integrated rotating main body portion 202.

The rotating shaft 86 has a cylindrical sleeve-shaped configuration made of ceramic and is formed at high accuracy to have a predetermined shape. The polygon mirror 106 includes a reflecting surface on the outer periphery thereof.

Further, the flange portion 200 is made of aluminum and a shaft fixing portion 204 and a flange body 206 are integrally formed with each other. The shaft fixing portion 204 has a cylindrical shape and is fixed by shrinkage fit to the outer periphery of the rotating shaft 86. The flange body 206 is formed in the shape of an annular ring having a thick rectangular cross-sectional configuration. A concave portion 208 having a rectangular cross-sectional configuration is formed on the surface of the flange body 206 on the side of the polygon mirror 106 so that the weight of the flange body 206 is decreased. In addition, a collar-shaped projecting portion 210 is formed integrally with an end portion on the outer periphery of the flange body 206 on the side of the polygon mirror 106.

The rotating main body portion 202 is entirely formed substantially in the shape of an annular ring having a large thickness and a concave portion 212 is formed on the surface of the rotating main body portion 202 facing the flange portion 200 so that a region of the flange body 206 is accommodated therein. Further, an annular ring portion of the rotating main body portion 202 on the side of an outer periphery of the concave portion 212 is formed as the thrust magnet 84. Moreover, the FG magnet portion 96 is provided in a circular hole portion 214 formed at the center of the rotating main body portion 202 on the side opposite to the flange body 206.

A narrow groove portion 216 is formed on the side of the outer periphery of the FG magnet 96 to eliminate an influence of annular ring-shaped magnetic lines of force and the main magnet portion 92 is further formed on the side of the outer periphery of the FG magnet portion 96.

The rotating main body portion 202 having the above-described structure is fixed to the flange portion 200 by adhering means using an adhesive agent, or the like so as to be integrated thereto, in such a manner that the shaft fixing portion 204 is inserted in and fitted to the hole portion 214, the flange body 206 is fitted into the concave portion 212, and the projecting portion 210 is placed on the thrust magnet 84.

When the rotor 64 is formed as described above, the flange portion 200 has high rigidity and the processing accuracy can also be improved. For this reason, well-balanced state of the rotor in which assembling accuracy is improved can be achieved. In addition, when the rotor 64 is used in a state of rotating at high speed for a long period of time, no distortion occurs due to high rigidity of the flange portion 200 and the operational reliability can be improved.

Meanwhile, other structures, operations, and effects of the sixth embodiment are the same as those of the first to fifth embodiments, and a detailed description thereof will be omitted.

Next, a seventh embodiment of the present invention will be described with reference to FIGS. 18 to 25.

The seventh embodiment relates to a method of manufacturing the rotating main body portion 88 of the rotor 64 by insert injection molding. Namely, an upper mold 218, a lower mold 220, and a core 222 of a molding die are used. First, the rotating shaft 86 is inserted in an interior central portion of a cavity 224 of the lower mold 220 and the core 222 is inserted into the hole of the rotating shaft 86. Subsequently, when the lower mold 220 is covered by the upper mold 218, the cavity 224 of the lower mold 220 and a cavity 226 of the upper mold 218 are integrated so that a space for injection molding which coincides with the outline of the rotating main body portion 88 is formed. Thereafter, the space formed by the cavities 224, 226 is filled with a resin magnetic material in which, for example, a ferritic magnetic material is mixed with nylon 12 and the rotating main body portion 88 is integrally formed with the rotating shaft 86 by injection molding.

By employing the above-described manufacturing method, high-accurate positioning of the rotating shaft 86 and the rotating main body portion 88 is achieved by improving the precision of the injection molding dies 218, 220 and the rotating shaft 86 and the rotating main body portion 88 can be formed integrally with each other at high accuracy. For this reason, a balance adjusting operation process of the integrated product can be eliminated and the process of adhering the rotating shaft 86 and the rotating main body portion 88 to each other can also be eliminated. In addition, since unstable material such as an adhesive agent is not used, products of stable quality can be manufactured easily and at low cost.

Moreover, due to molding pressure at the time of integral molding and shrinkage of the resin magnetic material, respective resin magnetic materials of the rotating shaft 86 and the rotating main body portion 88 can be rigidly connected to each other. In addition, the mounting surface 104 on which the polygon mirror 106 is disposed can also be formed at high accuracy.

Figure 19:
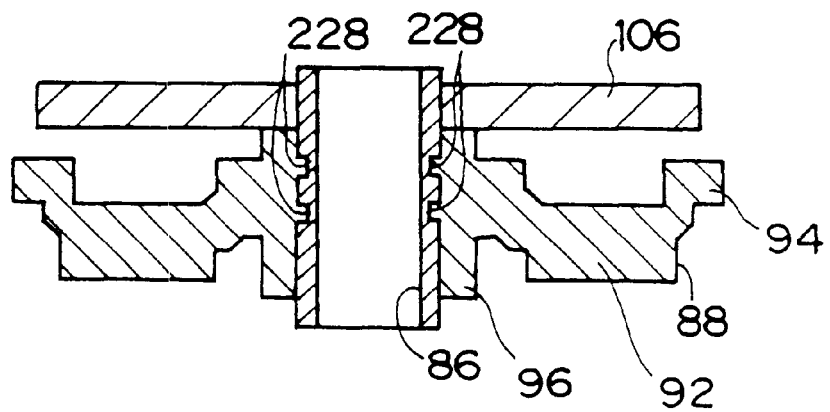
FIG. 19 is a longitudinal cross-sectional view showing the rotor section of the optical deflector including the motor according to the seventh embodiment of the present invention in a takeout state.
Figure 20:
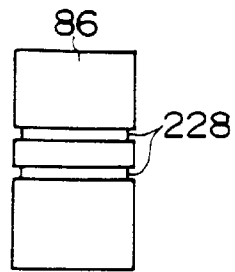
FIG. 20 is a longitudinal cross-sectional view showing a structure of grooves formed in a rotating shaft of the rotor section of the motor according to the seventh embodiment of the present invention at a portion where the rotating main body portion is stuck to the rotating shaft.
Figure 21:
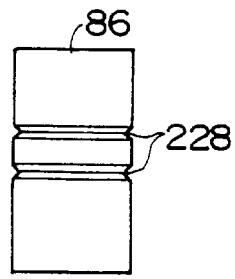
FIG. 21 is a longitudinal cross-sectional view showing another structure of grooves formed in the rotating shaft of the rotor section of the motor according to the seventh embodiment of the present invention at a portion where the rotating main body portion is stuck to the rotating shaft.
Figure 22:
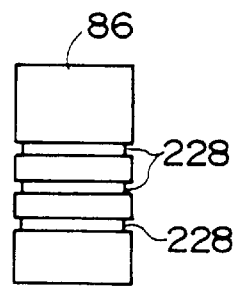
FIG. 22 is a longitudinal cross-sectional view showing still another structure of grooves formed in the rotating shaft of the rotor section of the motor according to the seventh embodiment of the present invention at a portion where the rotating main body portion is stuck to the rotating shaft.

In the manufacturing method of the seventh embodiment, it is preferable that a groove 228 is provided on the outer periphery of the rotating shaft 86 in order to strengthen adhesion of the rotating shaft 86 and the rotating main body portion 88. The groove 228 is formed at a portion at which the rotating shaft 86 and the rotating main body portion 88 are connected to each other. A single groove or a plurality of grooves 228 are provided in the shape of a ring around the rotating shaft 86. For example, as shown in FIGS. 19 and 20, two ring-shaped grooves 228 each having a rectangular cross-sectional configuration are formed, or as shown in FIG. 21, two grooves 228 each having a V-shaped cross-sectional configuration may be formed. Further, as shown in FIG. 22, three ring-shaped grooves 228 each having a rectangular cross-sectional configuration may also be formed. Moreover, a groove may be formed intermittently on the outer periphery of the rotating shaft, a groove may be formed to be inclined, or a plurality of grooves is formed in a crossing manner.

Figure 25:
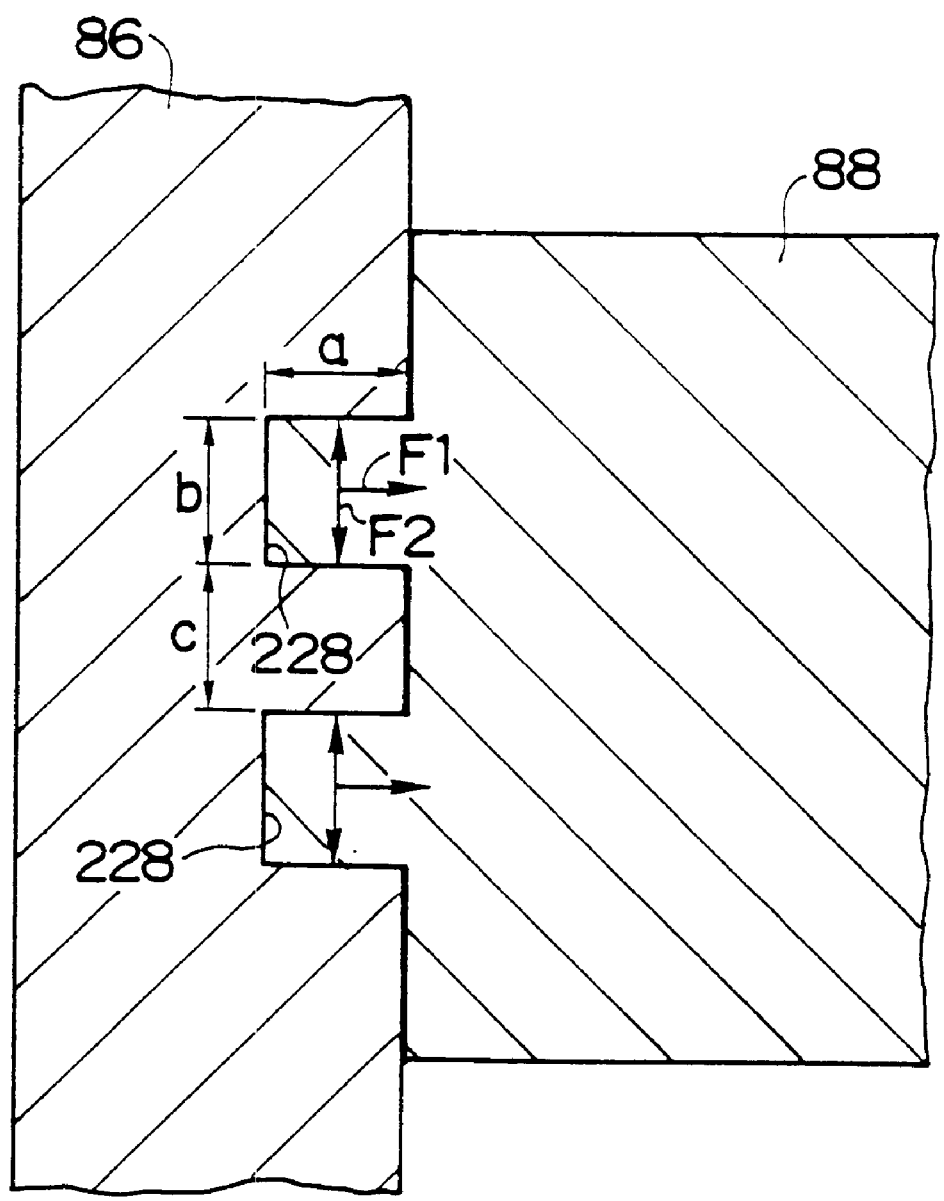
FIG. 25 is an enlarged longitudinal cross-sectional view of a principal portion, which illustrates connecting force acting between the grooves formed in the rotating shaft of the rotor section of the motor according to the seventh embodiment and a resin magnetic material.

When the groove 228 is formed in the rotating shaft 86, the larger the depth "a" of the groove 228 is made as shown in FIG. 25, the greater the effect in which the adhered state is strengthened becomes. Further, when the width "b" of the groove is made relatively wide, the adhered state is strengthened. Here, it is effective that the relationship between the depth "a" and the width "b" of the groove 228 is set such that (b/a)<3.

Further, when a plurality of grooves 228 is provided, the adhered state can be strengthened in such a manner that a large number of grooves is provided with the interval C of these grooves 228 being made small. By considering, from the above-described conditions, the strength characteristics of the resin magnetic materials for forming the rotating shaft 86 and the rotating main body portion 88, processing simplicity, and the like, an optimum shape and dimensions of the groove 228 are concretely determined.

For example, the connecting portion where the rotating main body portion 88 is integrally formed by injection molding with the rotating shaft 86 provided with two grooves 228 as shown in FIG. 20 allows generation of bonding force of the grooves 228 and the resin magnetic material due to peeling force F1 acting in the radial direction of the rotating shaft 86, which is generated by thermal expansion of the resin magnetic material of the rotating main body portion 88 contained in the groove 228, and expansion force F2 of the resin magnetic material of the rotating main body portion 88, which acts in the axial direction of the rotating shaft 86. For this reason, as compared with the case in which no groove 228 is provided, the respective resin magnetic materials of the rotating shaft 86 and the rotating main body portion 88 are rigidly connected to each other and the connecting strength thereof in the radial direction with respect to the rotating shaft core is improved. Particularly, the reliability of the rotor 64 which is placed in the state of being used by being rotated at high speed at a high temperature can be improved.

Figure 23:
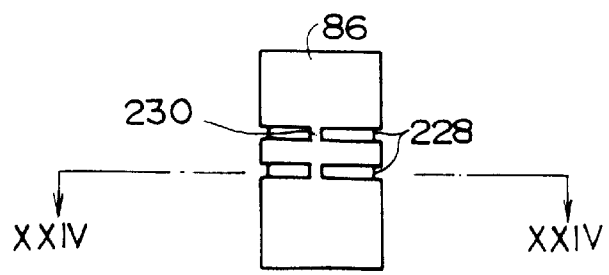
FIG. 23 is a longitudinal cross-sectional view showing a structure of a projecting key portion provided in a portion of the grooves formed in the rotating shaft of the rotor section of the motor according to the seventh embodiment of the present invention at a portion where the rotating main body portion is stuck to the rotating shaft.

Further, as shown in FIGS. 23 and 24, when a convex key portion 230 serving as a strengthening portion is formed in each of the grooves 228, for example, at two locations in the diametrical direction of the rotating shaft 86, the connecting strength of the rotating shaft 86 and the rotating main body portion 88 in the circumferential direction of the rotating shaft 86 is made strong and the reliability of the rotor 64 section can be improved still further.

Meanwhile, other structures, operations, and effects of the seventh embodiment are the same as those of the above-described first to six embodiments, and a detailed description thereof will be omitted.

Next, an eighth embodiment of the present invention will be described with reference to FIGS. 26 to 31. The eighth embodiment shows a method of manufacturing the rotating main body portion 88 in which the rotating main body portion 88 is insert-molded by magnetic-field injection molding in the rotating shaft 86 of the rotor 64. For this reason, the upper mold 218 and the lower mold 220 used for insert molding are respectively provided with ring-shaped permanent magnet portions 232, 234 which are disposed parallel to each other with the rotating main body portion 88 being interposed therebetween.

Figure 26:
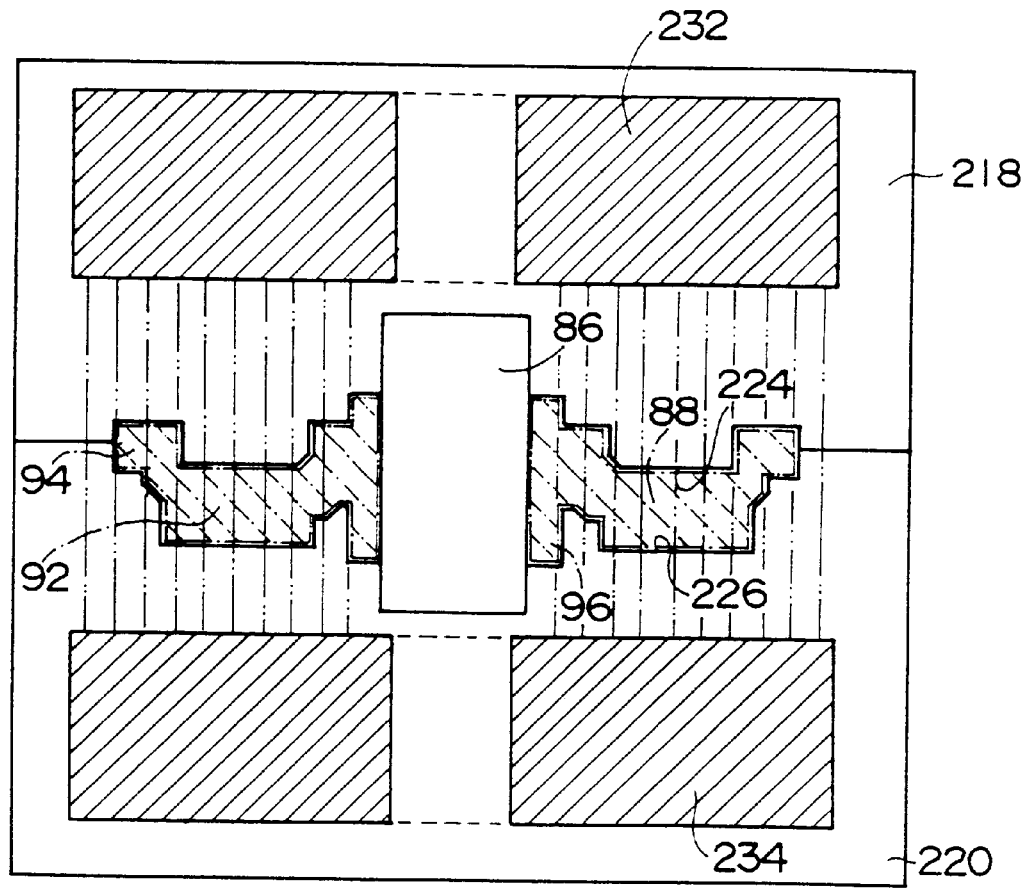
FIG. 26 is a longitudinal cross-sectional view showing a method in which a rotating main body portion is insert-molded in a rotating shaft of a rotor section of a motor according to an eighth embodiment of the present invention by magnetic-field injection molding.

These permanent magnet portions 232, 234 is each formed by a permanent magnet having a high magnetic force (i.e., a permanent magnet such as neodymium) and allows the magnetic lines of force, which are parallel to the axial line of the rotating shaft 86 as shown in FIG. 26, to pass through the rotating main body portion 88.

Figure 27:
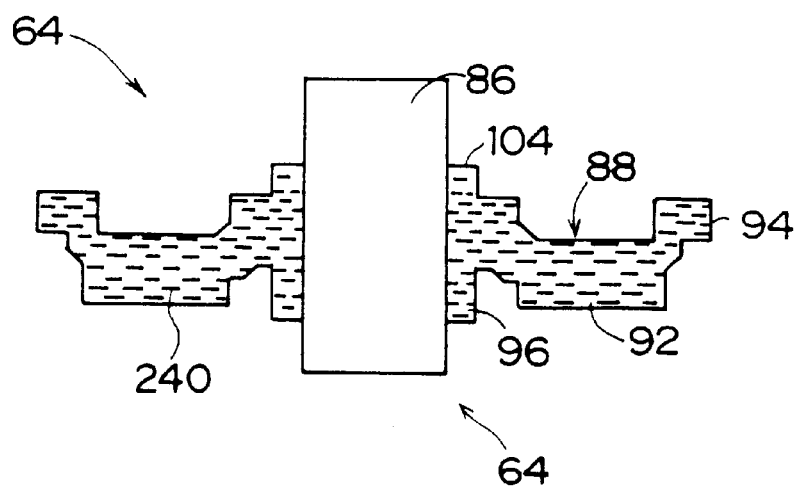
FIG. 27 is a longitudinal cross-sectional explanatory view showing a manufacturing method in which a main magnet portion, a thrust magnet portion, and an FG magnet portion are polarized in a rotating main body portion of the rotor section of an optical deflector including the motor according to the eight embodiment and a ninth embodiment of the present invention.

When the magnetic-field injection molding is effected by using the upper mold 218 and the lower mold 220 having the above-described permanent magnets 232, 234, respectively, the rotating shaft 86 is set within the cavities 224, 226 and the resin magnetic material (for example, a material in which ferritic magnetic material is mixed with nylon 12) is filled in a state of being melted at about 290° C. Thereafter, the filled resin magnetic material is cooled while controlling the charging pressure and the insert-molding product in which the rotating shaft 86 and the rotating main body portion 88 are integrated is obtained. At the time of injection molding, magnetic bodies within the resin magnetic materials are, as shown in FIG. 27, arranged in a fixed direction due to the magnetic lines of force passing through the cavities 224, 226 of the upper mold 218 and the lower mold 220 prior to solidification of resin. Here, the magnetic lines of force passing through the cavities 224, 226 are parallel to the axial line of the rotating shaft 86 entirely through the cavities 224, 226, and therefore, the magnetic bodies within the resin magnetic materials are uniformly arranged to be oriented in the direction which allows subsequent polarization effectively. Due to solidification of resin in this state, the material of the rotating main body portion is formed in such a manner that magnetic bodies shown in FIG. 27 are oriented to be polarized satisfactorily.

The material of the rotating main body portion formed as described above is polarized to have a predetermined magnetic force in accordance with the pattern shown in FIG. 3 described above, and the rotating main body portion 88 is completed.

Further, when the magnetic-field injection molding is effected in such a manner that, as described above, permanent magnets are disposed in the upper mold 218 and the lower mold 220 of the injection molding die, no electric power is required for anisotropy of the magnetic bodies within the resin magnetic material, thereby resulting in low-cost manufacturing. In addition, during an anisotropic operation, the permanent magnets generate no heat, and therefore, there is no possibility that the molding die is heated. As a result, as shown in FIG. 27, the resin magnetic material used to form the rotating main body portion 88 is made anisotropic, and in the subsequent processing step, the rotating main body portion 88 is effectively polarized so that the rotating main body portion having a complicated magnetic force pattern can be easily formed.

Figure 28:
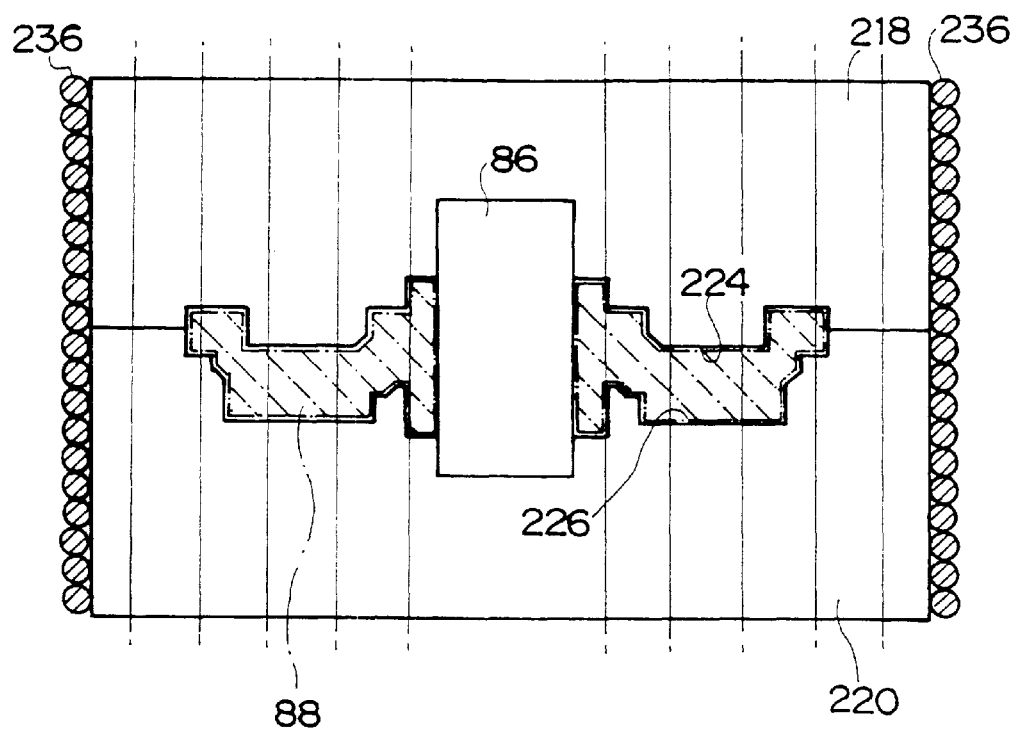
FIG. 28 is a longitudinal cross-sectional explanatory view showing a manufacturing method using a magnetic-field injection molding in which a coil is wound around a forming die so that the rotating main body portion of the rotor section of the optical deflector including the motor according to the eighth embodiment is made anisotropic.

Next, the magnetic-field injection molding will be described with reference to a case in which a coil is wound around the molding die. In this case, as shown in FIG. 28, a coil 236 is wound around respective outer peripheral portions of the upper mold 218 and the lower mold 220 in a wide range and is provided such that the magnetic lines of force generated by the coil 236 pass through all of interiors of the cavities 224, 226 of the upper mold 218 and the lower mold 220 in a state of being disposed straight in parallel to the axial line of the rotating shaft 86. With the above-described structure, the magnetic-field injection molding is effected in the same way as in the case shown in FIGS. 26 and 27.

Figure 29:
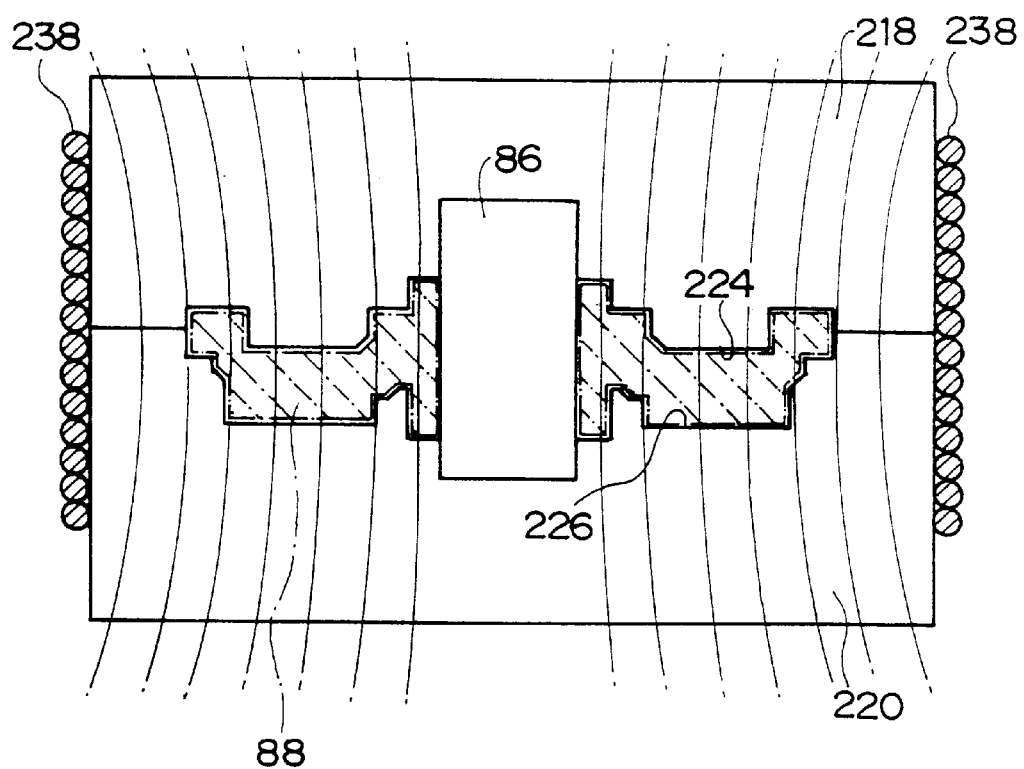
FIG. 29 is a longitudinal cross-sectional explanatory view showing a manufacturing method, in which a troublesome matter occurs, using a magnetic-field injection molding in which a coil is wound around a forming die so that the rotating main body portion of the rotor section of the optical deflector including the motor according to the eighth embodiment is made anisotropic.

Meanwhile, when the magnet-field injection molding using the above-described coil is effected, there is a possibility that, depending upon the wound state of the coil, the magnetic lines of force generated by the coil 238 are disposed parallel to the axial line of the rotating shaft 86 (for example, see FIG. 29). Further, when the magnetic lines of force are disposed in a curved manner, the magnetic bodies 240 within the resin magnetic material are, as shown in FIGS. 30 and 31, disposed in a state of having different orientations (the state of being oriented slantingly with respect to the axis of easy magnetization 242) at each of various positions in the rotating main body portion 88.

Figure 30:
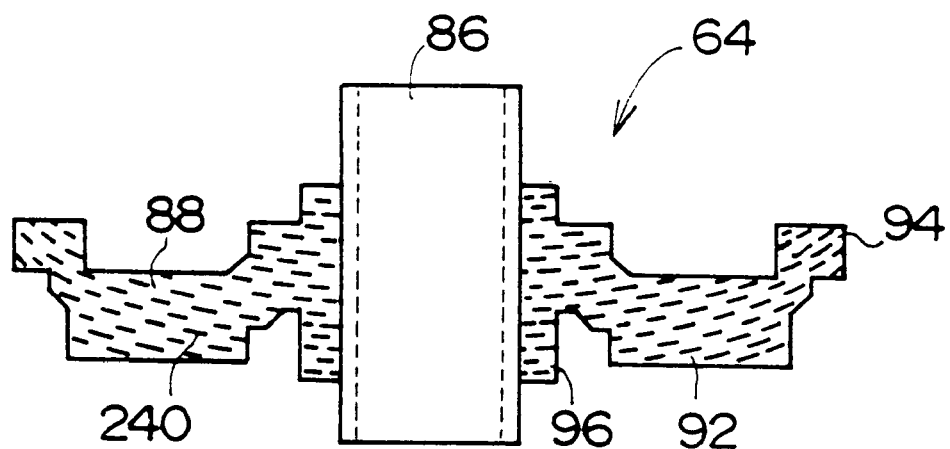
FIG. 30 is a longitudinal cross-sectional explanatory view showing a structure of the rotating main body portion in the rotor section of the optical deflector including the motor according to the eighth embodiment, in which a troublesome matter may occur when a main magnet portion, a thrust magnet portion, and an FG magnet portion are polarized in the rotating main body portion.
Figure 31:
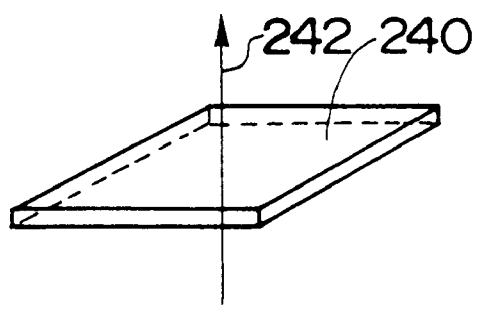
FIG. 31 is a schematic perspective view showing, by using a model, a state in which a magnetic body of the rotating main body portion in the rotor section of the optical deflector including the motor according to the eighth embodiment is not properly made anisotropic properly.

In FIG. 30, the magnetic bodies 240 disposed in the vicinities of the main magnet portion 92 and the FG magnet portion 96 of the rotating body portion 88 are arranged substantially along a predetermined direction due to linear magnetic lines of force. However, the magnetic lines of force in the vicinities of the thrust magnet portion 94 are disposed in a curved manner, and therefore, the magnetic bodies 240 are not disposed in the predetermined direction and may be brought into a state of not being completely made anisotropic accordingly.

In the state in which the rotating main body portion 88 is not formed in an integrated manner to completely have a polar anisotropy, when polarization is effected in accordance with the pattern shown in FIG. 3 in the subsequent processing step, the properties of the resin magnetic materials cannot be sufficiently exhibited, and particularly, the magnetic force of the thrust magnet portion 94 may be weakened. In this case, there is a possibility that the rotor 64 does not sufficiently float, or that uneven rotation of the rotor 64 occurs.

Accordingly, in order to prevent the magnetic force of the polarized portion from being made smaller than a predetermined value, the coil 236 is disposed such that the magnetic lines of force passing through the cavities 224, 226 are disposed parallel to the axial line of the rotating shaft 86, and the rotating main body portion is formed in an integrated manner so that the resin magnetic material has a polar anisotropy.

Meanwhile, other structures, operations, and effects of the eighth embodiment of the present invention are the same as those of the first to seventh embodiments, and a detailed description thereof will be omitted.

Next, a ninth embodiment of the present invention will be described with reference to FIG. 3 and FIG. 27.

The ninth embodiment provides a method of polarizing the main magnet portion 92, the thrust magnet portion 94, and the FG magnet portion 96 in the rotating main body portion 88.

When the rotating main body portion 88 having an integral structure is polarized in accordance with the pattern shown in FIG. 3, the main magnet portion 92 and the FG magnet portion 96 are first polarized (first step). Subsequently, the thrust magnet portion 94 is polarized (second step) and proper polarization of the rotating main body portion 88 is thereby completed.

The reason why the polarization is effected in the above-described manner is as follows. First, the main magnet portion 92 and the thrust magnet portion 94 in the rotating main body portion 88 are disposed close to each other due to the motor being formed to be of small size, and therefore, when the main magnet portion 92 and the thrust magnet portion 94 are polarized synchronously, the thrust magnet portion 94 is polarized under the influence of the magnetic force of the main magnet portion 92. For this reason, the floating magnetic force of the thrust magnet portion 94 decreases so that the rotor cannot sufficiently float. In addition, there is a possibility that unsatisfactory formation of a polar pattern of the main magnet portion 92 occurs under the influence of the magnetic force of the thrust magnet portion 94. Accordingly, in order to prevent the above-described drawbacks, the main magnet portion 92 and the thrust magnet portion 94 are polarized sequentially.

Further, the main magnet portion 92 is larger than the thrust magnet portion 94 and the thrust magnet portion 94 is apt to be influenced by polarization of the main magnet portion 92. For this reason, when the thrust magnet portion 94 is first polarized, and thereafter, the main magnet portion 92 is polarized, the thrust magnet portion 94 is largely polarized under the influence of the magnetic force of the main magnet portion 92. In order to prevent this drawback, when the thrust magnet portion 94 is polarized after polarization of the main magnet portion 92, magnetic force interference is prevented and each magnetic force required by the main magnet portion 92 and the thrust magnet portion 94 can be reliably obtained. In addition, the main magnet portion 92 and the thrust magnet portion 94 can be polarized in such a manner as to be disposed at positions adjacent to each other in the rotating main body portion 88 having the integral structure and the rotating main body portion 88 of small size, having high magnet power characteristics, can be provided.

Meanwhile, other structures, operations, and effects of the ninth embodiment of the present invention are the same as those of the first to eighth embodiments, and a detailed description thereof will be omitted.

Next, a tenth embodiment of the present invention will be described with reference to FIGS. 32 to 36.

The tenth embodiment provides a polarization jig for polarizing the rotating main body portion 88.

Figure 32:
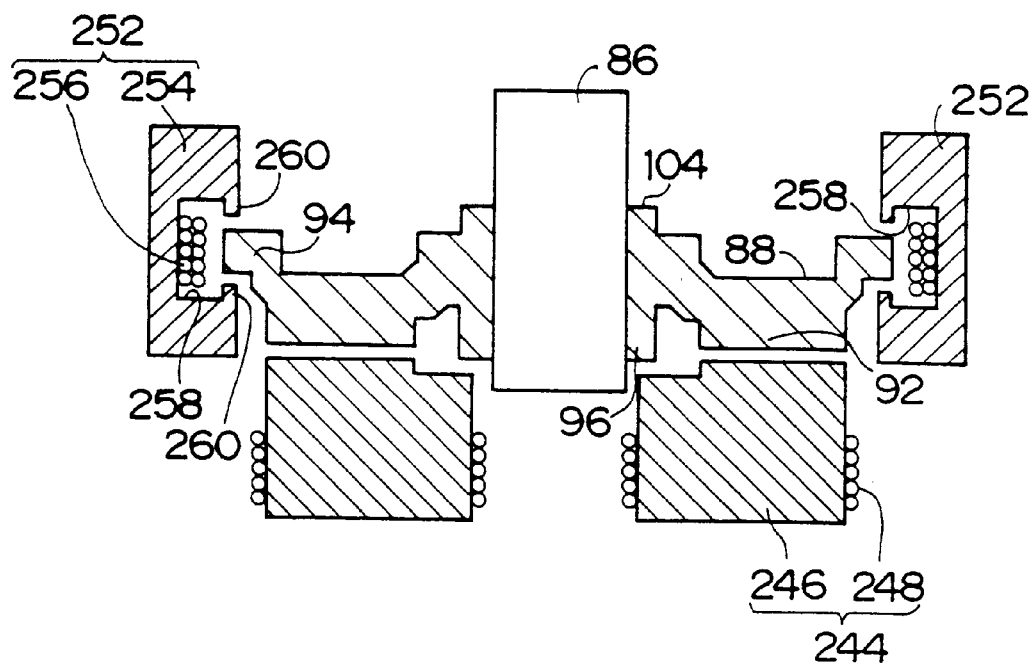
FIG. 32 is a longitudinal cross-sectional view showing the state in which a rotating main body portion in a rotor section of an optical deflector including a motor according to a tenth embodiment of the present invention is polarized by using a polarization jig.

As shown in FIG. 32, a polarization jig 244 used for polarization of the main magnet portion 92 and the FG magnet portion 96 of the rotating main body portion 88 is disposed on one side of the rotating main body portion 88, namely, only at the position below the bottom surface of the rotating main body portion 88 on the side opposite to the polygon mirror 106 in this embodiment (the position below the rotating main body portion 88 in FIG. 32).

Figure 33:
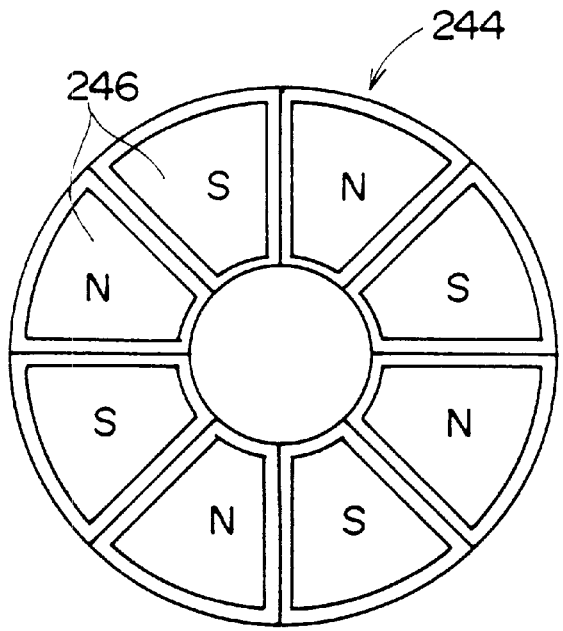
FIG. 33 is a front view of a polarization jig used to polarize the rotating main body portion in the rotor section of the optical deflector including a motor according to the tenth embodiment of the present invention.

The polarization jig 244 is entirely formed in the shape of a ring as shown in FIG. 33 and is divided into eight equal sections from the center. These eight sections are formed as eight polarization yokes 246 having respective poles. Further, a polarization yoke coil 248 is wound around these polarization yokes 246.

The polarization yoke coil 248 wound around these polarization yokes 246 is provided in such a manner that one coil is drawn around the yokes over all poles, and therefore, polarization timing is set without making deviation and a magnetic level of each pole is made uniform.

Figure 34:
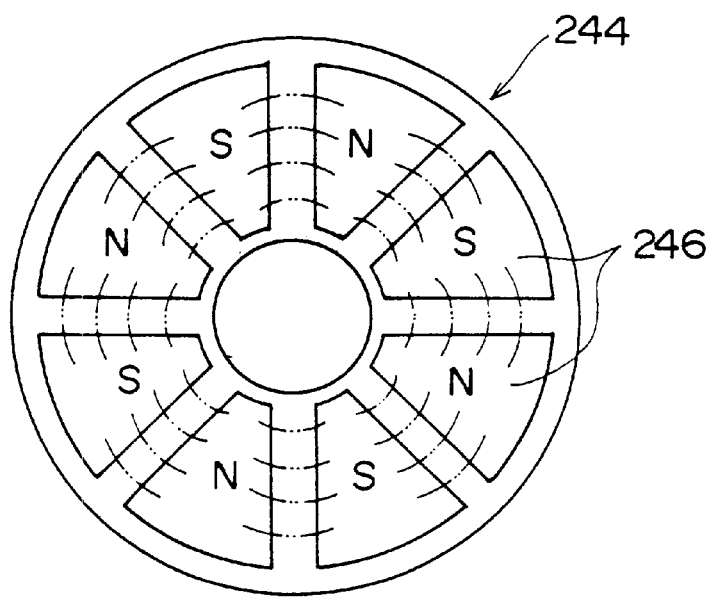
FIG. 34 is a schematic front explanatory view showing the state in which magnetic lines of force are generated by the polarization jig for polarizing the rotating main body portion in the rotor section of the optical deflector including the motor according to the tenth embodiment.
Figure 35:
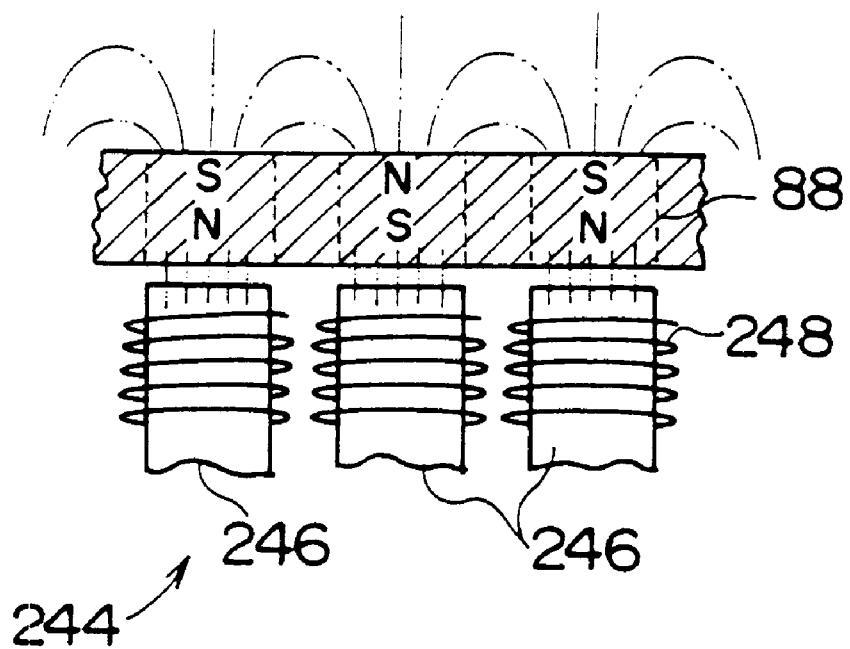
FIG. 35 is a schematic longitudinal cross-sectional explanatory view showing the state in which magnetic lines of force are generated by the polarization jig for polarizing the rotating main body portion in the rotor section of the optical deflector including the motor according to the tenth embodiment.

When polarization electric current flows into the polarization yoke coil 248 of the polarization jig 244, a magnetic field is generated from each of the polarization yokes 246 as shown in FIGS. 34 and 35 and the main magnet portion 92 and the FG magnet portion 96 are polarized in accordance with the pattern shown in FIG. 3. During this polarization, the magnetic field generated from each of the polarization yokes 246 is provided across adjacent polarization yokes 246, and the magnetic flux leakage leaks out to the thrust magnet portion 94 so as to prevent occurrence of magnetic force interference to the utmost.

Meanwhile, for example, as shown in FIG. 36, when polarization yokes 250 are disposed with the rotating main body portion 88 interposed therebetween, the amount of the magnetic flux of the magnetic field generated between the pair of polarization yokes 250, which leaks out to the side of the thrust magnet portion 94, increases due to the structure of the yokes 250. For this reason, prior to the polarization of the thrust magnet portion 94, it is effective that the polarization jig 244 shown in FIGS. 32 and 33 is used for polarization by the reason that the thrust magnet portion 94 cannot be polarized in a sufficient satisfactory state due to the magnetic force interference caused by an influence at the time of the polarization of the main magnet potion 92.

As shown in FIG. 32, the polarization jig 252 used for the polarization of the thrust magnet portion 94 of the rotating main body portion 88 is formed by the polarization yoke 254 and the polarization yoke coil 256.

The polarization yoke 254 is formed by an entirely ring-shaped magnetic body and is disposed so as to surround the thrust magnet portion 94 of the rotating main body portion 88. A concave portion 258 having a substantially C-shaped cross-sectional configuration is formed at a position, facing the thrust magnet portion 94, on the inner peripheral surface of the polarization yoke 254. A yoke end portion 260 having the shape of a small projecting peripheral member is formed at each of both peripheral ends of the opening of the concave portion 258. As shown in FIG. 32, each of the yoke end portions 260 is formed to become small to the utmost and an interval between an end of each yoke end portions and the surface of the thrust magnet portion 94 is made small extremely so as to prevent the magnetic flux from leaking out to the side of the main magnet portion 92. The polarization yoke coil 256 is disposed within the concave portion 258.

When the thrust magnet portion 94 is polarized by using the polarization jig 252, the polarization jig 252 is set with respect to the rotating main body portion 88 (see FIG. 32) and polarization voltage which is one tenth that of the main magnet portion 92 is applied to the polarization yoke coil 256. As a result, the magnetic field generated by the polarization coil 256 passes through the polarization yoke 254 and occurs concentratively in the thrust magnet portion 94. Accordingly, the leakage of magnet flux to the side of the main magnet portion 92 is prevented and the magnetic force interference is prevented to the utmost, thereby resulting in effective polarization and obtaining sufficiently the magnetic force required by the thrust magnet portion 94. For this reason, the main magnet portion 92 and the thrust magnet portion 94 can be disposed close to each other, and therefore, the rotor for a motor, which is made smaller and is excellent in magnet force characteristics, can be provided.

Meanwhile, other structures, operations, and effects of the tenth embodiment are the same as those of the first to ninth embodiments, and a detailed description thereof will be omitted.

In each of the above-described first to tenth embodiments, the main magnet portion 92 and the thrust magnet portion 94 in the rotating main body portion 88 of the rotor are each formed as a separate body, but the present invention is not limited to the same. For example, the main magnet portion 92 and the thrust magnet portion 94 may be formed in an integrated manner such that thrust magnet portion 94 is included in the main magnet portion 92.

Further, as illustrated in the first to tenth embodiments, by combining the structures and manufacturing methods provided therein and selectively using them, the rotating main body portion of the rotor can be manufactured in such a manner that the rotating main magnet portion 92, the FG magnet portion 96 for generating a speed-of-rotation detecting signal, and the rotor-side thrust magnet portion 94 for a thrust magnetic bearing which is a dynamic-pressure bearing are integrally formed with the mounting surface 104 which is provided as a pedestal for mounting the polygon mirror 106. Accordingly, the conventional structure in which each of magnet members, a shaft member, and the like are manufactured by adhering or shrinkage fit can be completely eliminated. As a result, these is no possibility of magnet portions being separated, and the reliability of the optical deflector can be improved. Further, the number of parts for forming the rotor section and the number of assembling processes can both be reduced and vibration during rotation of the rotor can also be restrained to a low level. For this reason, the balance correcting operation of the rotor, requiring a large number of processes, can be eliminated. Accordingly, even when the rotor is rotated at the speed of rotation from 10,000 rpm to 30,000 rpm or more, no adverse effect of vibration of the polygon mirror, or the like, upon the optical scanning operation is produced, and the motor and the method of manufacturing same in which a stabilized optical scanning operation is realized can be provided.

Further, the main magnet portion and the thrust magnet portion can be manufactured in such a manner as to be simply and properly polarized in the rotating main body portion of the rotor.

Moreover, since the main magnet and the thrust magnet can be formed to be close to each other, the optical deflector can be made smaller.

What is claimed is:

1. A motor comprising:
   a stator having a fixed shaft and a stator-side thrust magnet;
   a rotor having a rotating shaft, a rotating main body portion and a rotor-side thrust magnet, the rotating shaft supporting the rotor in a radial direction and being disposed around the fixed shaft to form a dynamic-pressure bearing, the rotor being supported by the stator-side thrust magnet of the stator in an axial direction of the rotating shaft,
   the rotating main body portion being mounted to the rotating shaft and integrally formed by a resin magnetic material, the rotating main body portion having a main magnet portion, an FG magnet portion for generating a speed-of-rotation detecting pulse, and a rotor-side thrust magnet portion respectively polarized at predetermined positions in the rotating main body portion.

2. A motor comprising:
   a stator having a fixed shaft and a stator-side thrust magnet;
   a rotor having a rotating shaft, a rotating main body portion and a rotor-side thrust magnet, the rotating shaft supporting the rotor in a radial direction of the rotating shaft and being disposed around the fixed shaft to form a dynamic-pressure bearing, the rotor being supported by the stator-side thrust magnet of the stator in an axial direction of the rotating shaft,
   the rotating main body portion being mounted to the rotating shaft and integrally formed by a resin magnetic material, the rotating main body portion having a main/FG magnet portion with a main magnet and an FG magnet for generating a speed-of-rotation detecting pulse, and a rotor-side thrust magnet portion respectively polarized at predetermined positions in the rotating main body portion.

29

3. A motor comprising:
a base portion serving as a stator, and having a fixed shaft, a stator-side base pedestal portion, a holder portion projecting from the stator-side base pedestal portion, and a stator-side thrust magnet portion integrally formed by a resin magnetic material, the stator-side thrust magnet portion being polarized to form a stator-side thrust magnet supporting the rotor in an axial direction of the rotating shaft;
a rotor having a rotating shaft, a rotating main body portion and a rotor-side thrust magnet, the rotating shaft supporting the rotor in a radial direction of the rotating shaft and being disposed around the fixed shaft to form a dynamic-pressure bearing, the rotor being supported by the stator-side thrust magnet.

4. A motor comprising:
a base portion serving as a stator, and having a fixed shaft, a stator-side base pedestal portion and a holder portion projecting from the stator-side base pedestal portion, formed from a nonmagnetic resin material, and a stator-side thrust magnet portion formed by a resin magnetic material, the nonmagnetic resin material and the magnetic resin material being integrally formed by two-color molding means, the stator-side thrust magnet portion being polarized to form a stator-side thrust magnet supporting the rotor in an axial direction of the rotating shaft;
a rotor having a rotating shaft, a rotating main body portion and a rotor-side thrust magnet, the rotating shaft supporting the rotor in a radial direction of the rotating shaft and being disposed around the fixed shaft to form a dynamic-pressure bearing, the rotor being supported by the stator-side thrust magnet.

5. A motor comprising:
a base portion serving as either a stator having a fixed shaft, a stator-side base pedestal portion, a holder portion projecting from the stator-side base pedestal portion, and a stator-side thrust magnet portion integrally formed by a resin magnetic material, the stator-side thrust magnet portion being polarized to form a stator-side thrust magnet, or a stator, and having a fixed shaft, a stator-side base pedestal portion and a holder portion projecting from the stator-side base pedestal portion, formed from a nonmagnetic resin material, and a stator-side thrust magnet portion formed by a resin magnetic material, the nonmagnetic resin material and the magnetic resin material being integrally formed by two-color molding means, the stator-side thrust magnet portion being polarized to form a stator-side thrust magnet supporting the rotor in an axial direction of the rotating shaft;
a rotor having a rotating shaft, a rotating main body portion and a rotor-side thrust magnet, the rotating shaft supporting the rotor in a radial direction of the rotating shaft and being disposed around the fixed shaft to form a dynamic-pressure bearing, the rotor being supported by the stator-side thrust magnet, and
the rotating main body portion being mounted to the rotating shaft and formed integrally by a resin magnetic material, the rotating main body portion either having a main magnet portion, an FG magnet portion for generating a speed-of-rotation detecting pulse, and a rotor-side thrust magnet portion serving as said rotor-side thrust magnet respectively polarized at predetermined positions, or having a main/FG magnet portion integrally formed with a main magnet and an FG magnet for generating a speed-of-rotation detecting pulse, and a rotor-side thrust magnet portion serving as said rotor-side thrust magnet respectively polarized at predetermined positions.

6. A motor according to claim 1, wherein the resin magnetic material and the resin material which are respectively used to form said rotating main body portion and said base portion are each formed with a reinforcing material mixed to improve strength thereof.

7. A motor comprising:
a stator having a fixed shaft and a stator-side thrust magnet;
a rotor having a rotating shaft, a rotating main body portion and a rotor-side thrust magnet, the rotating shaft supporting the rotor in a radial direction of the rotating shaft and being disposed around the fixed shaft to form a dynamic-pressure bearing, the rotating shaft having a flange portion made of a material having a relatively high rigidity, the rotor being supported by the stator-side thrust magnet of the stator in an axial direction of the rotating shaft;
a rotor-side thrust magnet disposed in the rotor to correspond to said stator-side thrust magnet,
wherein the rotating main body portion is mounted to said flange portion and formed integrally by a resin magnetic material, and the rotating main body portion has a main magnet portion, an FG magnet portion for generating a speed-of-rotation detecting pulse, and a rotor-side thrust magnet portion respectively polarized at predetermined positions in the rotating main body portion, and the FG magnet portion is either formed integrally with the main magnet portion or formed separately.

8. A motor comprising:
a stator having a fixed shaft and a stator-side thrust magnet;
a rotor having a rotating shaft, a rotating main body portion integrally formed from a resin magnetic material with the rotating shaft and a rotor-side thrust magnet, the rotating shaft supporting the rotor in a radial direction of the rotating shaft and being disposed around the fixed shaft to form a dynamic-pressure bearing, the rotating shaft having a flange portion made of a material having a relatively high rigidity, the rotor being supported by the stator-side thrust magnet of the stator in an axial direction of the rotating shaft;
a rotor-side thrust magnet disposed in the rotor to correspond to said stator-side thrust magnet,
wherein the rotating main body portion has a main magnet portion, an FG magnet portion for generating a speed-of-rotation detecting pulse, and a rotor-side thrust magnet portion, and the main magnet portion and FG magnet portion are either integrally formed or formed separately, and the magnet portions is respectively polarized at predetermined positions in the rotating main body portion.

9. A motor according to claim 8, wherein the rotating shaft and the rotating main body portion in the rotor are formed integrally by injection insert molding.

10. A motor according to claim 8, wherein a groove having a rectangular or V-shaped cross-sectional configuration is formed at a portion of the rotating shaft of the rotor, where the rotating main body portion is connected to the rotating shaft, so as to strengthen connection of the resin magnetic material of the rotating main body portion at least in the radial direction of the rotating shaft.

11. A motor according to claim 10, wherein a reinforcing portion is provided in a portion of the groove so as to reinforce connecting force of a circumferential direction acting between the rotating shaft and the resin magnetic material of the rotating main body portion.

12. A motor comprising:

a stator having a fixed shaft and a stator-side thrust magnet;

a rotor having a rotating shaft, a rotating main body portion and a rotor-side thrust magnet, the rotating shaft supporting the rotor in a radial direction of the rotating shaft and being disposed around the fixed shaft to form a gas dynamic-pressure bearing, the rotor being supported by the stator-side thrust magnet of the stator in an axial direction of the rotating shaft, wherein the rotating main body portion is mounted to the rotating shaft and integrally formed by a resin magnetic material, the rotating main body portion has a main magnet portion, an FG magnet portion for generating a speed-of-rotation detecting pulse, and a rotor-side thrust magnet portion respectively polarized at predetermined positions in the rotating main body portion.

* * * * *